(12) United States Patent
Zheng et al.

(10) Patent No.: US 8,065,725 B2
(45) Date of Patent: Nov. 22, 2011

(54) SYSTEMS AND METHODS FOR ENHANCED NETWORK SECURITY

(76) Inventors: Yuliang Zheng, Charlotte, NC (US); Lawrence Chin Shiun Teo, Charlotte, NC (US)

( * ) Notice: Subject to any disclaimer, the term of this patent is extended or adjusted under 35 U.S.C. 154(b) by 583 days.

(21) Appl. No.: 10/543,600

(22) PCT Filed: May 30, 2003

(86) PCT No.: PCT/US03/16816
§ 371 (c)(1),
(2), (4) Date: Jul. 27, 2005

(87) PCT Pub. No.: WO03/103214
PCT Pub. Date: Dec. 11, 2003

(65) Prior Publication Data
US 2006/0069912 A1    Mar. 30, 2006

Related U.S. Application Data

(60) Provisional application No. 60/384,787, filed on Jun. 3, 2002.

(51) Int. Cl.
*G06F 12/14* (2006.01)
(52) U.S. Cl. ............ 726/22; 713/151; 713/153; 709/200
(58) Field of Classification Search ........................ None
See application file for complete search history.

(56) References Cited

U.S. PATENT DOCUMENTS

| | | | |
|---|---|---|---|
| 5,796,942 A | 8/1998 | Esbensen | |
| 5,991,881 A | 11/1999 | Conklin et al. | |
| 6,711,615 B2 * | 3/2004 | Porras et al. | 709/224 |
| 6,775,657 B1 * | 8/2004 | Baker | 706/45 |
| 6,834,310 B2 * | 12/2004 | Munger et al. | 709/232 |
| 6,971,028 B1 * | 11/2005 | Lyle et al. | 726/25 |
| 7,058,968 B2 * | 6/2006 | Rowland et al. | 726/1 |
| 7,174,566 B2 * | 2/2007 | Yadav | 726/26 |
| 7,239,605 B2 * | 7/2007 | Dinker et al. | 370/216 |
| 7,313,695 B2 * | 12/2007 | Norton et al. | 713/166 |
| 7,327,683 B2 * | 2/2008 | Ogier et al. | 370/236 |
| 7,328,336 B2 * | 2/2008 | Zsohar | 713/153 |
| 2002/0191573 A1 * | 12/2002 | Whitehill et al. | 370/338 |
| 2003/0149887 A1 * | 8/2003 | Yadav | 713/200 |
| 2004/0193891 A1 * | 9/2004 | Ollila | 713/182 |
| 2004/0205360 A1 | 10/2004 | Norton et al. | |
| 2005/0216764 A1 | 9/2005 | Norton et al. | |

(Continued)

OTHER PUBLICATIONS

Krugel, C. et al., "Applying Mobile Agent Technology to Intrusion Detection." 2001, Distribution Systems Group, Technical University Vienna, pp. 1-3.

(Continued)

*Primary Examiner* — Kaveh Abrishamkar
(74) *Attorney, Agent, or Firm* — James G. Passé; Passeé Intellectual Property, LLC

(57) ABSTRACT

Systems and methods for an information system security infrastructure are described. One embodiment of the present invention comprises global Internet-scale defense infrastructure, referred to as the Intrusion Detection Force (IDF). The IDF comprises a virtual infrastructure implemented on top of an existing network, such as the Internet. The IDF enables secure information sharing and intelligent data analysis and response. The node (e.g. 102 of FIG. 1) is the most primitive entity in the IDF architecture, and may be a switch, router, server, or workstation. The IDF may be implemented in small networks of computers or may be utilized by millions of hosts throughout the Internet, spanning different organizations, countries, and continents.

11 Claims, 12 Drawing Sheets

U.S. PATENT DOCUMENTS

2006/0069912 A1* 3/2006 Zheng et al. .................. 713/151

OTHER PUBLICATIONS

Krugel, C. et al., "Flexible, Mobile Agent based Intrusion Detection for Dynamic Networks." 2002. Distribution Systems Group, Technical University Vienna, pp. 1-5.

Patent Cooperation Treaty, International Search Report, International Application No. PCT/US03/16816, mailed on Aug. 29. 2003, 5 pages.

Ragsdale, D. J., "Adaptation Techniques for Intrusion Detection and Intrusion Response Systems." Proceedings of IEEE International Conference on Systems, Man, and Cybernetics, vol. 4, TN, Oct. 2000, pp. 1-4.

DeepSight Analyzer, What is DeepSight Analyzer? web page at http://www.analyzer.symantec.com/AnalyzerIntro.aspx, as available via the Internet and printed Mar. 23, 2006.

DShield, Distributed Intrusion Detection System, web page at http://www.dshield.org.as available via the Internet and printed Mar. 23, 2006.

The Honeynet Project, About the Project, web page at http://www.honeynet.org/misc/project.html, as available via the Internet and printed Mar. 23, 2006.

Internet Security Systems, X-Force Threat Analysis Service, web page at http://www.xforce.iss.net/xftas, as available via the Internet and printed Mar. 23, 2006.

SANS, Internet Storm Center, Cooperative Cyber Threat Monitor and Alert System, web page at http://www.isc.sans.org, as available via the internet and printed Mar. 23, 2006.

Trusted Source Portal, Spam Senders by Geographic Region, web page a t http://www.trustedsource.org, as available via the internet and printed Mar. 23, 2006.

* cited by examiner

```
Let collective C = <n₁ ... nⱼ>.

For every node nᵢ in collective C
// Recovery
If (nᵣ = receive(CheckState, Sub:Revive)) then
    SetState(nᵣ, Active)
    If (r = (i - 1) or r = (i + 1)) then
        Establish(nᵣ)
    End If
    If CheckState(nᵢ) = Supporting then
        SetState(nᵢ, Active)
    End If
End If // Reconstruction
state = CheckState(nᵢ₊₁)
If state != Unreachable then
    continue
End If
If no response after timeout then
    SetState(nᵢ₊₁, Unreachable)
    nₖ = Lookup(next available node in C)
    Establish(nₖ)
    SetState(nᵢ, Supporting)
    SetState(nₖ, Supporting)
End If
End For
```

FIG. 7

SYSTEMS AND METHODS FOR ENHANCED NETWORK SECURITY

CROSS-REFERENCE TO RELATED APPLICATIONS

This application claims priority to U.S. Provisional Application No. 60/384,787, filed Jun. 3, 2002, the entire disclosure of which is incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document, but otherwise reserves all copyrights whatsoever.

FIELD OF THE INVENTION

The present invention relates generally to information security. The present invention more particularly relates to intrusion detection, security, and survivability for information systems.

BACKGROUND

Since its inception more than 20 years ago, the field of intrusion detection has been growing rapidly. Early intrusion detection systems (IDSs) catered only for a single host at most, a small network. As networks expanded and organizations grew, there was clearly a need for large-scale distributed intrusion detection. This led to the emergence of distributed IDSs such as NADIR, Distributed Intrusion Detection System (DIDS) (S. R. Snapp, J. Brentano, G. V. Dias, T. L. Goan, L. T. Heberlein, C. L. Ho, K. N. Levitt, B. Mukherjee, S. E. Smaha, T. Grance, D. M. Teal, and D. Mansur. "DIDS distributed intrusion detection system)-motivation, architecture, and an early prototype." In *Proc. of the 14th National Computer Security Conference*, pages 167-176, October 1991.), GrIDS (S. Staniford-Chen, S. Cheung, R. Crawford, M. Dilger, J. Frank, J. Hoagland, K Levitt, C. Wee, R. Yip, and D. Zerkle. "GrIDS—a graph-based intrusion detection system for large networks." In *Proc. of the 19th National Information Security Conference*, Baltimore, Md., October 1996.), and AAFID (J. S. Balasubramaniyan, J. O. G. Fernandez, D. Isacoff, E. Spafford, and D. Zamboni. "An architecture for intrusion detection using autonomous agents." *Technical Report* 98/05, COAST Laboratory, Purdue University, May 1998). Commercial IDSs have also adopted the distributed data collection and processing paradigm.

Although these conventional IDSs handle distributed intrusion detection, they focus primarily on intrusion detection within only the one organization in which they are located. An IDS in one organization does not communicate with an IDS in a second organization. Without inter-organizational information sharing, the potential of the IDSs and intelligence-gathering ability of these organizations become severely limited. For example, the stand-alone configurations present in conventional systems makes it difficult to detect distributed and stealthy attacks that span across the Internet, such as distributed denial of service (DDoS) attacks.

The conventional infrastructure of the Internet is another factor limiting the ability of organizations to conduct better attack detection and prevention. Since the TCP/IP protocol suite was not designed with security in mind (S. M. Bellovin. "Security weaknesses in the TCP/IP protocol suite." *Computer Communications Review*, 2(19): 32-48, 1989), it is infeasible to rely on it as the foundation for security.

The effectiveness of IDSs at detecting sophisticated attacks would increase significantly if there were inter-organizational communication and sharing of information among IDSs.

SUMMARY

Embodiments of the present invention provide systems and methods for enhanced network security. One embodiment comprises a security infrastructure operable to communicate with a computer network and operable to facilitate the communication of security data between nodes in the network. Each of the nodes comprises an adaptation layer for translating application or platform-dependent commands, and a security agent for facilitating the security and update processes that occur on and between the nodes.

A security agent in one embodiment of this invention comprises a variety of processing engines, such as an analysis engine, a plug-in extension engine, a software update distribution engine, and a response engine. The various engines may be in communication with data stores, such as a vulnerability database, anomaly profile database, an attacker profile database, and a software update repository. In another embodiment, the security agent comprises a data collection sensor.

A node in an embodiment of the present invention may comprise a normal node or a supernode and may be part of a node collective or supernode collective. The collectives are capable of communication with one another.

In an embodiment of the present invention, one node receives a plurality of data values from a plurality of nodes in order to detect whether a network intrusion has occurred. The node may respond to the network intrusion, instruct the other nodes to respond to the intrusion, or may cause an alert message to be sent. An embodiment of the present invention may act proactively to protect the nodes of the infrastructure from attacks by transmitting software updates to the nodes.

Embodiments of the present invention provide numerous advantages over conventional network security solutions. By providing an infrastructure in which the various nodes in a network are able to communicate security-relevant data with one another, an embodiment of the present invention provides the capability of detecting and responding to security threats in a network spanning multiple organizations and across the Internet.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein:

FIG. 7 is a pseudocode listing for a process of reconstruction and recovery in one embodiment of the present invention;

DETAILED DESCRIPTION

Figure 1:
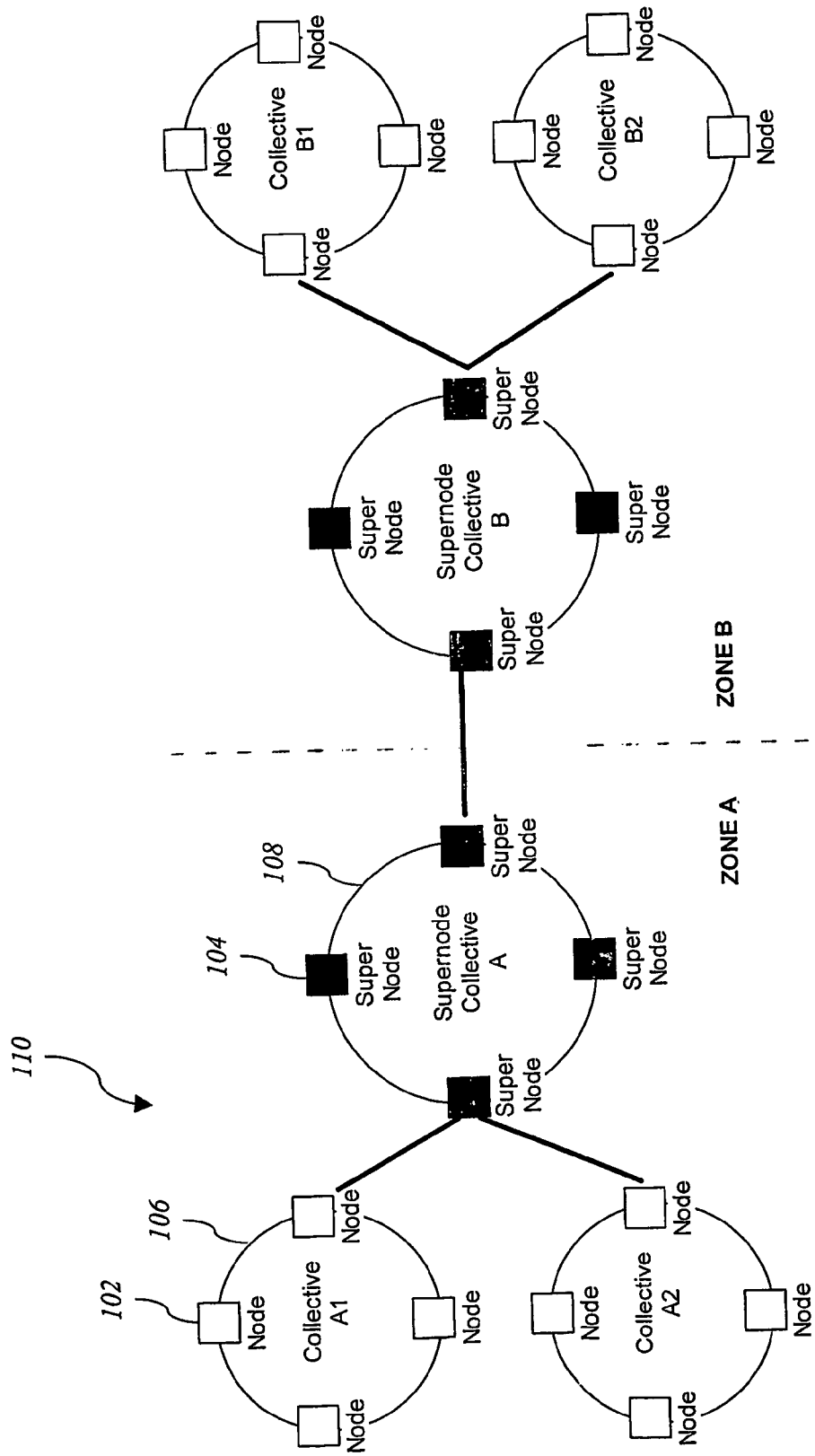
FIG. 1 is a diagram illustrating the hierarchical model in one embodiment of the present invention.

Embodiments of the present invention provide systems and methods for an information system security infrastructure. One embodiment of the present invention comprises a global Internet-scale defense infrastructure, referred to herein as the Intrusion Detection Force (IDF). The IDF protects organizations and defends the Internet as a whole.

The IDF comprises a virtual infrastructure implemented on top of an existing network, such as the Internet. The IDF enables secure information sharing and intelligent data analysis and response. The IDF may be implemented in small networks of computers or may be utilized by millions of hosts throughout the Internet, spanning different organizations, countries, and continents.

The IDF infrastructure described herein comprises entities and groups of entities, which span the Internet and work in different areas with the overall goal of defending the information resources of the organizations and the Internet as a whole.

One embodiment of the present invention comprises four primary features: information sharing, scalability, security, and survivability. Various embodiments include elements to support these four features in varying degrees.

Information sharing is the active exchange of information among the IDF community that will benefit each member in the IDF. The information shared is analyzed and used to protect and defend the various participating organizations themselves. This is different from the behavior of the conventional IDSs, which mainly confines all information inside the organization itself.

In the context of the IDF, it should be noted that the term "information" does not refer to proprietary information of companies and organizations; rather, it refers to network traffic data and generic data collected from hosts that are used by the IDF for analysis. In reality, however, organizations continue to be concerned about the exchange of information, even if it is clearly shown that it is not proprietary. This is understandable because it is only natural for organizations to be concerned about the privacy of their data. However, certain protocols may contain proprietary information that is sent in the clear over the network. For example, it cannot be avoided if an insecure telnet connection shows some amount of confidential information over the network in the clear.

This problem can be addressed in two fronts using technology and policy. Firstly, the technology has to be sophisticated enough to intelligently filter outgoing information by blinding out private information while preserving other information needed for analysis. The technology has to decide which parts of the information need to be blinded, and which do not.

The second approach is to allow organizations to define and customize the information sharing policy. This allows organizations to determine the level and the amount of information to be shared with other organizations. It is also important to provide users with pre-defined policies for them to choose rather than assuming the users are sophisticated in terms of understanding security and the consequences of information sharing.

Embodiments of the present invention also provide scalability. The Internet consists of millions of inter-connected hosts. In order for the IDF to scale to the size of the Internet, it provides features useful for catering to the needs of millions of hosts. One feature utilized by an embodiment of the present invention to enhance its scalability is the use of global, unique addressing methods.

Embodiments of the present invention also provide a security component. The IDF's role in exchanging information between different organizations brings with it the responsibility of securing these information exchanges. Since the IDF is deployed on systems and networks, which are untrusted and which may have questionable reliability, the IDF is assumed to be operating in a hostile and non-trusting environment and operating on an unreliable underlying network.

The security aspects of the IDF may be divided based on the three traditional aims of security: confidentiality, integrity, and availability.

The nature of the information exchanged by the IDF between organizations can be used to gather intelligence about the organizations for malicious purposes. Therefore, an embodiment of the present invention provides security methods to keep the IDF information exchanges confidential. This defends against attacks such as eavesdropping and other malicious information-gathering attacks. In one embodiment, using encryption ensures the security of these information exchanges. In such an embodiment, encrypted information exchanges for different organizations are performed using a form of public key infrastructure (PKI). Since in a networked system lacking sufficient security, an attacker may be able to modify or spoof information exchanges in order to confuse the system for illegal purposes, and embodiment of the present invention provides security mechanisms to protect against unauthorized modification of messages.

The IDF according to the present invention also ensures the availability of its services to organizations. Ensuring availability of the IDF can be difficult. Embodiments of the present invention have the capability to respond to numerous types of incidents, including a typical distributed denial-of-service attack and physical disruptions in the network.

In order to provide maximum security of the IDF itself, one embodiment of the present invention uses one or more of cryptography, authentication, and authorization schemes.

Survivability, though related to security, is a distinct requirement. Survivability is the ability of a system to function in the face of attacks and failures. Survivability is vital because no system, no matter how well designed and implemented, is totally immune to failures. Survivability is even more important in an embodiment of the present invention because the IDF is deployed in a highly distributed manner in potentially hostile environments throughout the Internet. The aim of survivability is not to prevent failures, but to ensure that even if the system fails, it will do so in a controlled, predictable, and fail-safe manner.

One embodiment of the present invention uses application-level fault tolerance to achieve survivability. Such an embodiment provides protection even when the underlying network on which the IDF runs is not sufficiently fault tolerant. Thus, application-level fault tolerance complements existing system-level fault tolerance mechanisms.

Embodiments of the present invention also provide interoperability, extensibility, and achieve a balance between usability and security.

A conventional network environment consists of heterogeneous systems. The types of network, operating systems, hardware platforms, security solutions, and so on are very likely to be different. Legacy systems further complicate the environment.

To address issues of interoperability, one embodiment integrates the IDF with the technologies currently in use in the organization. The integration solution is platform and network independent, allowing deployment of the IDF into any potential heterogeneous environment in a typical organization.

An embodiment of the present invention is also extensible. Accordingly, new applications are able to take advantage of the infrastructure. The IDF provides a secure platform for developers to design and implement new applications.

An embodiment of the present invention provides an infrastructure, which allows various intrusion detection and response engines to communicate. The IDS comprises entities, which can wrap around other already-available intrusion detection engines. The following list describes various aspects of one embodiment of the present invention as they relate to detection, response, audit sources, interoperability, data collection, data processing, and systems security in the IDF:

1. Detection is performed in real time.
   In order to achieve high-speed response and proactively react to intrusions, one embodiment of the present invention performs detection in real time as opposed to in batch mode.
2. Response can be either passive or active.
   The type of response can either be passive or active, depending on the security policy defined by the administrator. Passive here means that the events will be stored in a log; while active means that the events will trigger some actions (such as attack countermeasures), which will respond accordingly to the event. Both modes are supported because it may not be practical to force the user into just one mode; one of the requirements of the IDF is to be highly interoperable, which also implies flexibility to adjust to various security policies. Response is also high-speed and timely to react to events, regardless of whether the active or passive mode is chosen.
3. The audit sources must be taken from both the host and network.
   The IDF is capable of spanning the entire Internet and runs on a variety of hosts and networks. Since attacks can be launched from and against both hosts and networks, the IDF's capabilities are limited if the audit sources are confined to either host or network only. Unlike conventional intrusion detection engines, the IDF is able to work on a very large scale and gather as much data as possible for analysis.
4. The IDF has a high degree of interoperability.
   The IDF will be used in a heterogeneous environment. Accordingly, it is highly interoperable with various operating systems, networks, machine architectures, and other security solutions.
5. Data collection must be done in a distributed manner.
   Since the IDF's target environment is extremely large and may consist of various heterogeneous systems, data collection must be performed in a distributed manner.
6. Data processing must be done in a distributed manner.
   Two of the attributes described above are security and survivability. In order for the IDF to protect the organizations, the data collected from them must be available for analysis. Even if the systems that host them do fail, they must do so in a fail-safe manner. To accomplish this, data is replicated so that it can be retrieved from elsewhere even if the systems that host them are no longer available.
7. The security of the IDF is high.
   The IDF itself is able to withstand hostile attack against its architecture. It is resistant to tampering, even from the hosts it is running on. The security of an IDS itself is one area that has not been addressed by many other IDSs.

Referring now to the drawings in which like numerals indicate like elements throughout the several Figures, FIG. 1 is a diagram illustrating the hierarchical model in one embodiment of the present invention. In the embodiment shown, the architecture uses a two-level hierarchical model. This model achieves simplicity since there are only two types of entities to implement. To achieve scalability and security, the entities may link to one another, forming a distributed infrastructure.

The embodiment shown in FIG. 1 includes nodes. The node is the most primitive entity in the IDF architecture. The node is a device with a processor. The node may be for example, a switch, router, server, or workstation. Its primary function is to exchange messages securely with other nodes, as part of the solution to the information-sharing component. Apart from this primary function, the node also performs other tasks related to the shared information as described in relation to FIG. 7 below.

A node comprises two elements: a host and a software agent. A host is a computing device, such as a workstation, mobile device, laptop computer, or other device capable of executing instructions stored on a computer-readable medium. A software agent is a set of instructions capable of being executed on the host that performs the tasks required for the IDF.

The embodiment shown in FIG. 1 includes two types of nodes: a normal node 102 (as described in the previous paragraph) and a supernode 104. A supernode 104 is a special node that performs higher-level functions compared to a normal node. The primary purpose of a supernode is to perform analysis of data captured by other nodes, both normal and supernodes. In one embodiment, one software package is installed on both the node and the supernode. The configuration of the software after it is installed determines whether the node functions as a normal node or a supernode.

Using a two-level hierarchical model, nodes reside at the lower level while supernodes reside at the higher level in the hierarchy. In FIG. 1, the nodes are represented by the white boxes, including node 102, while the supernodes are represented by black boxes, including supernode 104.

In order for the IDF to be survivable, the IDF in Figure includes two additional entities: the collective 106 and super-collective 108. A collective 106 is a collection of nodes using the topology of a ring. Likewise, a super-collective 108 is a collection of supernodes (a super-collective may also be referred to as a supernode collective).

The reason a collective is in the form of a ring is to achieve data availability and survivability through data replication. Similar to the way peer-to-peer file sharing systems work, the nodes in a collective can exchange data to introduce redundancy. This minimizes the loss of data in the event of a crash or denial-of-service attack. Configurations other than a ring may be utilized in other embodiments.

A zone 110 is a logical area of the IDF that is placed under the authority of a super-collective. Zones simplify administration and management of the super-collective and their associated collectives. The concept of a zone 110 is similar to that of a subnet in a LAN; just as a LAN can be segmented into smaller subnets for easier administration, a zone 110 can be used to divide a large organization down into smaller more-manageable areas. Zones also allow scalability and compartmentalization of information.

For example, in one embodiment of an IDF according to the present invention, a zone is implemented in a large university. A zone is set up for each department. If needed, a large department may comprise segments or smaller zones, e.g., research units. Using zones, the administrator can scale the IDF according to the size of the organization. Likewise, a company can have separate zones for its branches and departments.

Table 1 includes a summary of the entities discussed herein. The basic entity of the IDF is a node 102. Nodes form collectives 106. A special node called the supernode forms super-collectives 108. Collectives 106 register themselves with super-collectives 108. The area under the authority of a super-collective is called a zone 110. Nodes enable information sharing. Supernodes provide analysis. Collectives allow redundancy to support security and survivability. Zones facilitate management and administration, as well as scalability.

TABLE 1

IDF entities: Names, definitions, and functions.

| Name | Definition and Function |
|---|---|
| Node | A node is a host, which is running an IDF software agent. A node shares information with other nodes. |
| Collective | A collection of nodes. Nodes in a collective forward information to each other in order to achieve resiliency and support availability (security) and survivability. |
| Supernode | A supernode is a special node that provides higher-level services to collectives. These services usually involve those not available at the node level, such as CPU-intensive operations. |
| Super-collective | A collection of supernodes, acting in the same way as the collective to achieve resiliency among supernodes. |
| Zone | An area of the network or Internet under the authority of a super-collective. Facilitates management and administration, and achieves scalability. |

Figure 2:
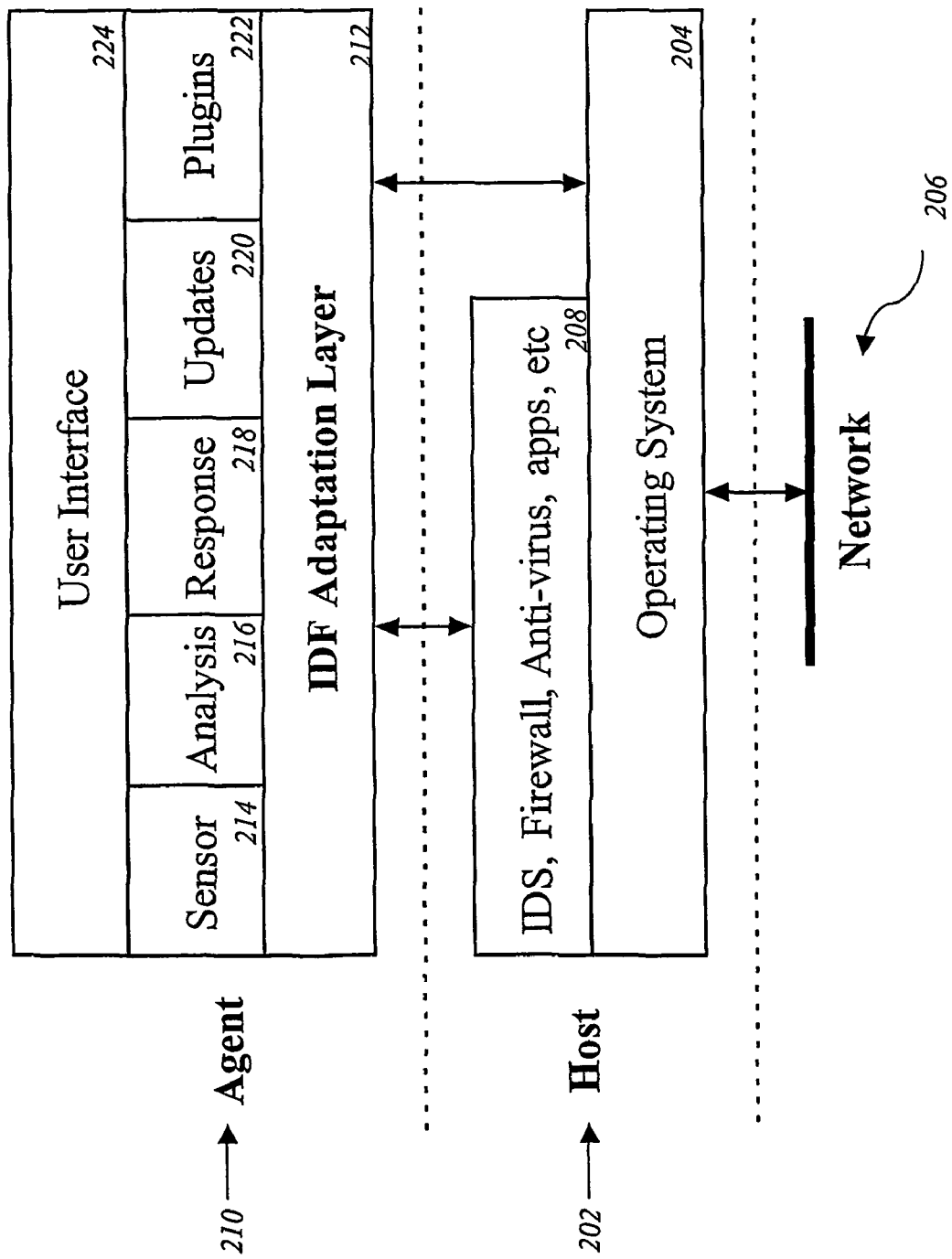
FIG. 2 is a block diagram illustrating the relationship between the host, agent, and underlying network in one embodiment of the present invention.

As stated above, a node in an embodiment of the present invention includes a host and an agent. FIG. 2 is a block diagram illustrating the relationship between the host, agent, and underlying network. In the embodiment shown in FIG. 2, the host 202 comprises an operating system 204 in communication with a network 206. The host 202 executes software in the operating system environment 204, such as an intruder detection system (IDS), firewall, anti-virus, and various other applications 208.

The node illustrated in FIG. 2 also includes an Agent 210. The agent includes the entities of the IDF in various levels. At the first level is the intrusion detection force adaptation layer (IDFAL) 212. The IDFAL 212 provides the interface to the operating system 204 and applications 208 on the host 202. For example, in the embodiment shown, the IDAFL 212 provides translation of commands from various components of the agent into commands that are understood by the applications 208 and the operating system 204. The IDAFL 212 also translates responses into a form that may be utilized by the components of the agent. In communication with the IDFAL 212 are the various component engines of the IDF, including the sensor engine 214, analysis engine 216, response engine 218, software updates engine 220, and the plugins engine 222. The embodiment shown also includes user interface 224 for controlling and accessing the various components of the IDF. The components shown on the host and agent of the node in FIG. 2 are merely exemplary, a particular node may include a fewer or greater number of components depending on the specific embodiment.

In an embodiment of the present invention, the components of the IDF comprise program code stored on a computer-readable medium. A processor on the node executes the program code. The processor may include, for example, digital logic processors capable of processing input, executing algorithms, and generating output as necessary in response to the inputs received from the nodes. Such processors may include a microprocessor, an ASIC, and state machines. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor in a node, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel both wired and wireless. The instructions may comprise code written in any computer-programming language, including, for example, C, C++, C#, Visual Basic, Java, and JavaScript.

Figure 3:
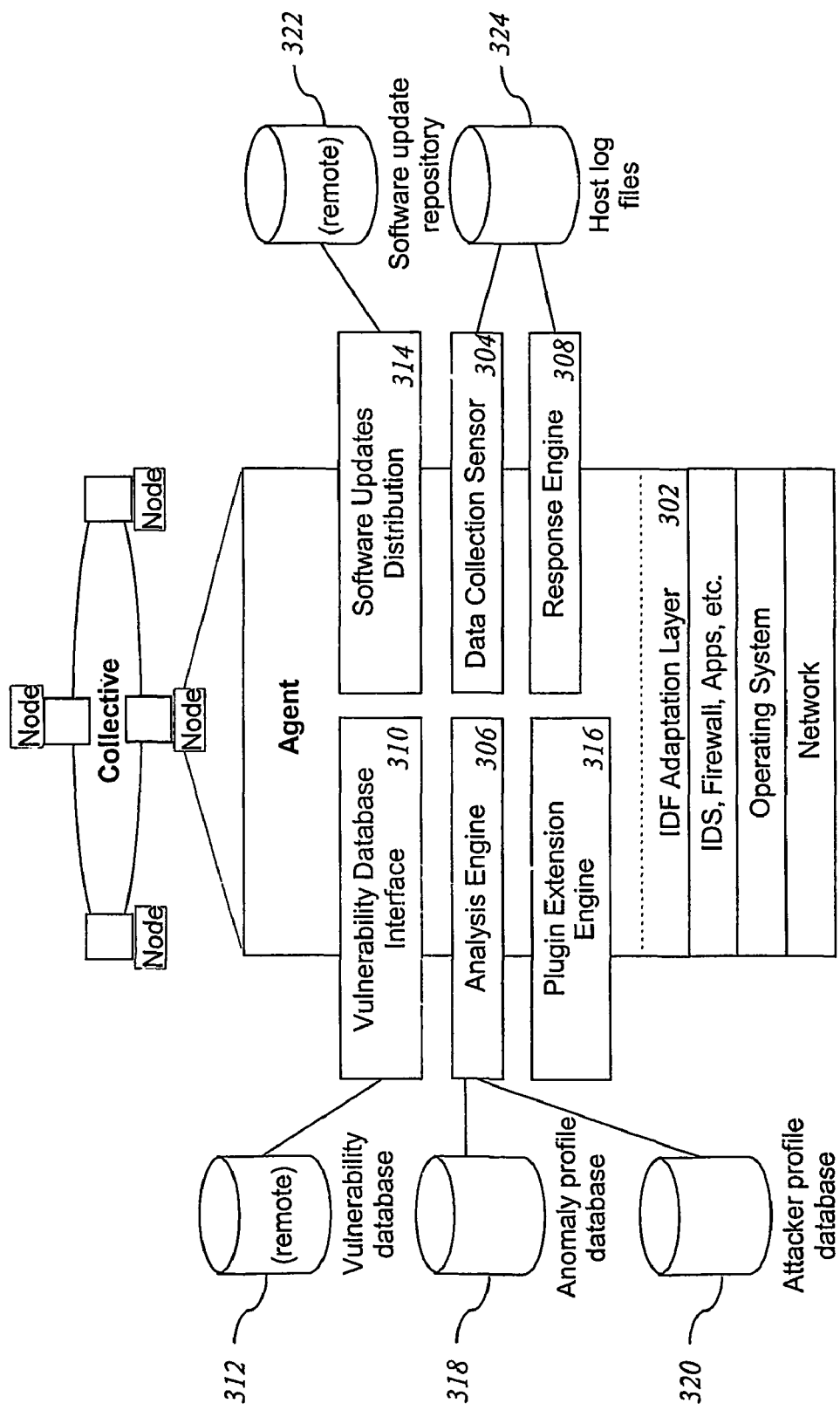
FIG. 3 is a block diagram, illustrating the components of a software agent in one embodiment of the present invention.

A node in an embodiment of the present invention includes a software agent. FIG. 3 is a block diagram, illustrating the components of the software agent. In the embodiment shown, the IDF comprises an Intrusion Detection Force Adaptation Layer (IDFAL) 302. The IDFAL 302 is an integration component that interfaces with the hosts (node's) existing security software (other IDSs, firewalls, anti-virus software), applications, and the operating system. It provides a layer of abstraction between platform-specific parts and the IDF components.

While the IDFAL 302 in the embodiment shown has a few similarities with virtual machines, such as Java's, the main difference is that the IDFAL is not a separate entity that interprets and executes code given to it. It more closely resembles the system call API of an operating system that provides platform-specific low-level functions. The IDFAL 302 is precompiled into the node itself (or more specifically, into the IDF software agent running on the host). An advantage of this approach is that it achieves higher speed and better efficiency compared to the separately compiled virtual machine-style approach. Other embodiments utilize the virtual machine-style approach.

The IDFAL 302 provides a generic platform- and network-independent interface to higher-level IDF components. Note that although IDFAL 302 may be network independent, in the embodiment shown, the IDFAL 302 is specific to TCP/IP. The IDFAL 302 is designed to be modular and to provide a more loosely coupled separate layer of interaction in order to achieve platform independence as well as support tasks not related to intrusion detection, such as updates and plugins.

To gain a better idea of how the IDFAL 302 works, consider an embodiment in which an IDF node is deployed into a heterogeneous environment with different IDSs. The task of collecting data from the IDSs individually in such an environment would be difficult. With the IDFAL 302 in place, the specific IDSs can be queried in a uniform manner by the higher-level IDF components.

Referring again to FIG. 3, the embodiment shown comprises a data collection sensor 304. The data collection sensor 304 performs the task of gathering events from the host and network. Collected data are logged on the host's log files. These data are then sent to the analysis engine so that they can be used to identify intrusions as well as provide intelligence for future investigations on suspicious behavior. The ability of this component is specific to the IDS that it is wrapped around. In one embodiment, the data collection sensor 304 gathers data related to only the host. In another embodiment, the data collection sensor 304 also gathers data related to other components in the network, such as switches and routers in communication with the host.

The functions provided by data collection sensor 304 at the node level are to log host-specific events and to forward collected data to supernodes at periodic intervals (so as to not overwhelm the supernodes). At the supernode level, the component collects data from nodes. This data is then analyzed at the supernode.

The embodiment shown in FIG. 3 also includes an analysis engine 306. The analysis engine may perform a variety of tasks, including: signature-based intrusion detection, anomaly detection, and attacker profiling. Signature-based intrusion detection uses electronic signatures of previously identified attacks to identify new attacks. Anomaly detection involves sensing activity outside of the normal operation of the network. Attacker profiling involves assessing the identifiers of the computer or person accessing the network to determine if that computer or person has been the source of previous attacks. The large scale of an IDF deployment results in the generation of a large amount of data. As such, processing this data with both signature-based pattern analysis and anomaly detection techniques yields useful results. Attacker profiling refers to the method of gathering unique behavioral signatures of an attacker, which is useful to organizations such as law enforcement. Examples of a "unique behavioral signature" include the type of words an attacker uses to deface a website, and the set of frequent typos made by the attacker at the UNIX shell.

The analysis engine 306 is deployed on two levels: at the node level, as well as at the supernode level. The node-level analysis is similar to what a conventional IDS would do. The node-level analysis engine performs audit reduction and lightweight analysis and forwards relevant analysis results to the supernode-level analysis engine.

The supernode-level analysis engine performs higher-level processing which includes identifying trends and suspicious behavior found in the zone for which the supernode is responsible or other zones. It also performs audit reduction and shares its analysis results with neighboring super-collectives. The analysis engines on various nodes perform synchronization to ensure that the analysis from various nodes remains consistent.

The embodiment shown in FIG. 3 also includes a Response Engine 308. If intrusions are detected, the IDF uses the Response Engine 308 to send the results to a systems administrator or other destination. The Response Engine 308 provides a generic interface to the actual response mechanism, which may include writing data to a log file, causing a window alert to be displayed, calling a pager, sending an email or short message service (SMS), or causing some other type of communication to be sent. The Response Engine 308 can work in both active and passive mode depending on the policy of the administrator of the IDF. The Response Engine 308 receives data from nodes and supernodes in various zones.

The response engine 308 may also take proactive attack countermeasures to prevent further damage to the host, such as requesting new software updates for the host's platform to prevent future attacks using the same vulnerability. Another preventative measure that the response engine 308 may perform is to dynamically change firewall rules on the host to ensure that future attacks of the same nature do not happen. The IDF allows these passive and active responses while adhering to the security policy of the organizations.

The embodiment shown in FIG. 3 also includes a vulnerability database interface (VDI) 310. The VDI 310 provides an interface to the IDF's own Vulnerability Database 312 as well as publicly available vulnerability databases (not shown). Examples of public vulnerability databases include the SecurityFocus vulnerability database (http://www.securityfocus.com/corporate/products/vdb) and CVE (The MITRE Corporation, "Common vulnerabilities and exposures (CVE)." World Wide Web. http://cve.mitre.org/) (while defined as a "dictionary" instead of a database, the IDF should still be able to use CVE for this purpose). The VDI 310 provides up-to-date vulnerability information to the other components such as the analysis engine 306 and software updates distribution engine 314.

The embodiment shown also includes a software updates distribution engine 314, which is designed to enable the ability to preemptively react to an attack before it happens. The software updates distribution engine 314 propagates software updates to IDF nodes in a fast and timely manner. The engine 314 also ensures that the software updates are delivered in a secure manner. In one embodiment, software updates are stored and mirrored in many repositories to ensure that they are always available even when one repository fails.

To provide the software updates distribution engine 314 with data necessary to correctly distribute software updates, a node first registers software applications, operating systems and versions and the like with the responsible supernode. As newly released and audited software updates become available, the supernode pushes the updates to the registered nodes.

The software updates distribution engine 314 relies on system configuration information to push out the correct updates to the individual node. The system configuration information relative to an embodiment of the present invention consists of five categories: Meta information, hardware, operating system, software, and services.

Meta information states what exactly the host is. For example, Meta information may indicate that the host is a workstation or a handheld device. Hardware information is used when delivering updates that affect hardware, such as device drivers. Hardware information also includes the processor that the host runs on, its speed, CPU cache, memory size, and so on. Hardware information is important in identifying hosts with potential hardware bugs. Software describes the vendor of the software installed, the categories (for example, an email client belongs to the category "desktop/email"), and version number. The operating system, being an extremely crucial part of the host, is treated separately from the software. Services are the type of services that a host provides to external entities (such as HTTP or SMTP).

In an embodiment of the present invention, the software update may be categorized. For example, in one embodiment the software updates are divided into four different categories: a bugfix, a security alert, an enhancement, and an announcement.

A bugfix is an update that corrects a general error in the program. In this context, the error is not a security hole. A security alert update corrects a security-related bug that may lead to host compromise or a break-in. Examples of such bugs include buffer overflows, format string vulnerabilities, race conditions, and so on. An enhancement adds new features to software. Sometimes, it is not possible to provide an update to a piece of software automatically. For example, there may be a bug in the operating system kernel, which would require a reboot. If the host is restarted on a busy server automatically, users may lose their work. In such cases, and all other similar cases, an Announcement update is used instead. The Announcement update provides the systems administrator with information about a potential threat, and how to address it manually. These four categories of software updates are not mutually exclusive. For example, an update may be both a security alert and an enhancement.

The network may be compliant with the Common Vulnerabilities and Exposures (CVE). If so, the update itself will include a list of entries specifying the CVE entries that it is associated with. This list shows the list of vulnerabilities in the CVE dictionary that the update corrects.

A typical update object has a name, package name, package version, URL, digital signature, a list of CVE entries, and an optional section on special instructions specifying how to run the update. The digital signature is used to verify the authenticity and integrity of the update.

Embodiments of the present invention may provide various methods for retrieving or providing software updates. One embodiment provides two methods that can be used by the agent to retrieve updates from the repository. The first method is to have the network deliver the update from the repository to the agents. In this method, the update is retrieved by the supernode, and then sent to all appropriate nodes that have matching system configurations. The advantage of this approach is that the update can be sent securely from the repository to the agent. However, this is not always possible. A commercial software vendor may place licensing restrictions on their updates, preventing them from being stored on third party repositories.

A second update retrieval method is provided to address this issue. Since the repository cannot host the actual update, the supernode sends only the URL and a message digest of the update to the agent. The agent will retrieve the update from the URL. The update's authenticity is verified by running the message digest algorithm against the downloaded update, to see if it matches the one provided by the supernode. The update transfer from the vendor's site does not have to be secure, since a positive match between the message digests verifies the authenticity. In another embodiment, the update's authenticity is checked by verifying its digital signature against the public certificate of the source of the update.

There may be times when a faulty update is issued by a vendor, and the update has been applied to various nodes. One embodiment addresses this issue by storing backups of old packages and logs of updates, which state which files have changed and at what time. This information can then be used to perform a recovery operation, which is similar to a database Rollback operation. The format and content of these logs are configurable by the systems administrator.

An embodiment of the present invention may provide the administrator with several options for responding to the receipt of updates. For example in one embodiment, the agent applies any and all updates automatically. In another embodiment, the agent emails the system administrator with a notification of the need to perform the update but does not actually perform the update. In another embodiment, the update is sent to the host but not installed; instead, a log entry, recording receipt of the update, is generated.

The embodiment of the present invention shown in FIG. 3 also includes a plugin extension engine 316. The plugin extension engine 316 provides extensibility. The engine 316 allows third-party developers to develop plugins for the IDF agent, allowing the IDF agent to perform tasks that it was not originally designed for. For example, in one embodiment, a third party develops a virtual reality user interface for accessing the IDF. The user interface utilizes the plugins engine 316 to extract data from and provide input to the IDF.

Third-party IDF plugins may be authenticated and certified before they can be used, to prevent the unauthorized plugins from being used. To support the Plugin Extension Engine 316, one embodiment of the present invention includes a standard and extensible API for developing IDF plugins.

The embodiment shown in FIG. 3 also includes various data stores. Data stores store information that is used by the IDF systems. The major data stores are the rules database (not shown), the anomaly profile database 318, the attacker profile database 320, the software update repository 322, the vulnerability database 312, and the host file logs.

In the embodiment shown, the rules database stores attack signatures and is used for rule-based detection. The database includes rules for basic events as well as distributed pattern events. A basic event is an event that affects only one host, such as the number of incorrect SSH logins exceeding a specific threshold. A distributed pattern event affects various hosts, such as the "island-hopping" attack. The rules database is primarily used by the analysis engine for attack signature matching.

The anomaly profile database 318 is a database of statistical anomaly profiles used to track the user or system behavior of a host. It is similar to the type of database used for anomaly detection systems. This database 318 is primarily used by the analysis engine for detecting anomalous behavior. The attacker profile database 320 consists of a distributed database of attacker profiles. This keeps track of unique signatures for attackers. When attackers compromise a machine, their "fingerprints" are sent to the global attacker profiles database.

Software update repositories 322 keep a distributed, consistent, and secure mirror of software updates used to upgrade/update the software and agents running on nodes in the IDF. The Vulnerability Database 312 is the IDF's growing collection of vulnerabilities. These vulnerabilities are verified and certified before being added to the database. Host log files 324 are the local files used to keep track of events happening at the node level.

Embodiments of the present invention include communications components that communicate over a communications protocol. In one embodiment, a Communication and Recovery Subsystem handles communications.

The Communication and Recovery Subsystem is used to handle communication and recovery operations. In an embodiment in which the functions of communications and recovery are combined together into one subsystem, the two operations are tightly coupled for the purposes of the IDF. Communications are handled concurrently with recovery to improve the security and survivability of the IDF. In addition, recovery operations are highly dependent on the communication protocols.

The communications component of the subsystem includes functionality at the both the node and supernode levels. The component facilitates the exchange of messages between nodes, including node-to-node, node-to-supernode, supernode-to-node, and supernode-to-supernode communications. In one embodiment, for collective-to-collective communication, the communication subsystem automatically elects a node to be in forwarding mode to represent the collective. If the node fails, a new forwarding node is automatically re-elected (this is actually part of the recovery process). The component is also responsible for all aspects of node addressing and routing. Node addresses are assigned and identified using this subsystem. If a node wishes to communicate with another node, the subsystem on the source node queries neighboring nodes to work out the best route to the destination node. The communication subsystem also addresses congestion issues. This is particularly important when the underlying physical network is unreliable, such as in wireless networks. The communications component also handles registration of nodes with supernodes.

At the collective level, the communication component of the communications and recovery subsystem initiates the formation of new collectives and keeps track of changes in the collective. For example, in one embodiment, the communication component is responsible for node additions and removals. The communication component may also maintain the state of nodes in a collective (whether they are active, idle, unreachable, etc.), so that the nodes can carry out their message exchanges and make routing decisions accurately. In one embodiment, in order for every node to know the states of other nodes, the communications component broadcasts messages out to every node in the collective. In another embodiment, the communications component ensures that a node knows the states of only its neighboring nodes. The broadcast approach ensures that each node has an accurate picture of the states of the nodes but may flood the network with redundant or unnecessary communications. The neighbor approach creates less traffic on the network, but the information may be less timely, thus potentially adversely affecting routing decisions.

An embodiment of the present invention utilizes several basic concepts in communications. In one embodiment, the IDF uses two node identifiers. The first is a 128-bit address for the nodes, which is publicly known. This corresponds roughly to a physical address, which would be analogous to a hardware MAC address on a network interface. The size of the address, 128 bits, provides scalability. The second identifier is a pseudonym, which is described herein in relation to security requirements and strategies.

Routing is performed at the application level, in a manner similar to those used in peer-to-peer systems. The IDF sends its information using IDF messages (or IDF "packets"/"protocol data units"). The message format accommodates priorities, so that these messages reach their destinations faster than others.

In an embodiment of the present invention, each transmitted message comprises a header and a payload. The header and payload support the privacy mechanisms.

In one embodiment, the message header consists of:
Routing hints—hints sent to the intermediary nodes so that they would have a guideline as to where and how to forward the messages;
Sender—the address/identifier of the sender;
Recipient—the address/identifier of the recipient; and
Priority—what is the priority of this message.

The embodiment includes two types of message payloads: a control payload containing commands and data payload containing either audit records or traffic records.

In one embodiment, the IDF nodes are capable of sending four basic types of messages to each other, referred to as message operations. The message operations are one-way, notification, request-response, and solicit-response.

The message types may be used in any communication in the IDF. The following discussion describes an embodiment in which a node is communicating with a supernode.

In such an embodiment, a one-way message operation is asynchronous as well as uni-directional, where the node sends a one-way message to the supernode and does not expect any message in return. Likewise, the notification operation is asynchronous and uni-directional, where the node receives a one-way message from the supernode, but does not need to send a reply message to the supernode. A request-response message operation is bi-directional, where the node sends a request message to the supernode, and the supernode replies with a response. A solicit-response operation is also bi-directional, but in this case, the supernode sends a message to a node, and the node is expected to respond to that message at a later time.

An embodiment of the present invention builds basic messages, which are based on the message operations. In one embodiment, the major basic messages are described as follows:

1. Register: The Register message is a request-response message that allows a node to register itself with a supernode collective.
2. Join: The Join message is a request-response message that allows a node to register itself with a node collective.
3. Establish: The Establish message is a request-response message that allows a node to establish communication with another node.
4. SendConfig: The SendConfig message is a request-response message that allows a node to send its system configuration to a supernode collective. The software updates distribution engine uses this message to keep track of the configurations of each node. When there is a new update available for a particular configuration, the update will be pushed to the nodes with the matching configurations. This is done using the SendUpdate message.
5. SendResults: The SendResults message is a request-response message used by the node to send its analysis results to the supernode collective. The supernode collective then processes the results to search for intrusion patterns at a higher level. The SendResults message can be sent periodically, or on demand when there are results available.
6. Lookup: The Lookup message is used by both nodes and supernodes to query for the location of a node or supernode by its name. It is similar to a DNS query on the Internet. It is a request-response message.
7. SendUpdate: The SendUpdate message is a solicit-response message used by the supernode to send software updates to nodes with matching configurations. Upon successfully sending the message and the update, the node(s) are expected to acknowledge receipt and successful application of the updates.
8. CheckState: The CheckState message is used by a node to check the current condition of another node. It is somewhat analogical to the Internet ping utility, which is used to see if a machine is alive. It can also be used by a supernode to check the current condition of its registered nodes. Conversely, a node may send a CheckState message to a supernode for the same reason. The CheckState uses both the request-response and solicit-response operations.

9. Duplicate: The Duplicate message is a request-response message used by a node to another node, or a supernode to another supernode. It is mainly used to duplicate a message for redundancy purposes. This is used to achieve robustness and reliability.

10. PluginAction: The PluginAction message is a request-response message used by the Plugin Extension Engine for sending plugin-specific messages between nodes.

In general, a message M of type t is represented by $M_t=<t, s, d, c_t, A_t>$, where s is the source node ID, d is the destination node ID, and c is a subcommand that is specific to message type t. $A_t$ is the sequence of arguments that is used by subcommand c, where $A_t=(a_1, \ldots, a_{k_c})$ and $a_i \neq 0$ and $1 \leq i \leq k_c$ and $k_c$ is the maximum number of arguments supported by subcommand c. Depending on t, c and $A_t$ are optional. Please note that the source s and destination d are both explicitly specified in the message so that they can be mutually authenticated by the PKI mechanisms which IDF uses.

These ten basic messages are not exhaustive. An embodiment of the present invention may utilize a subset or a superset of these messages in support of the various functions of the IDF.

Figure 4:
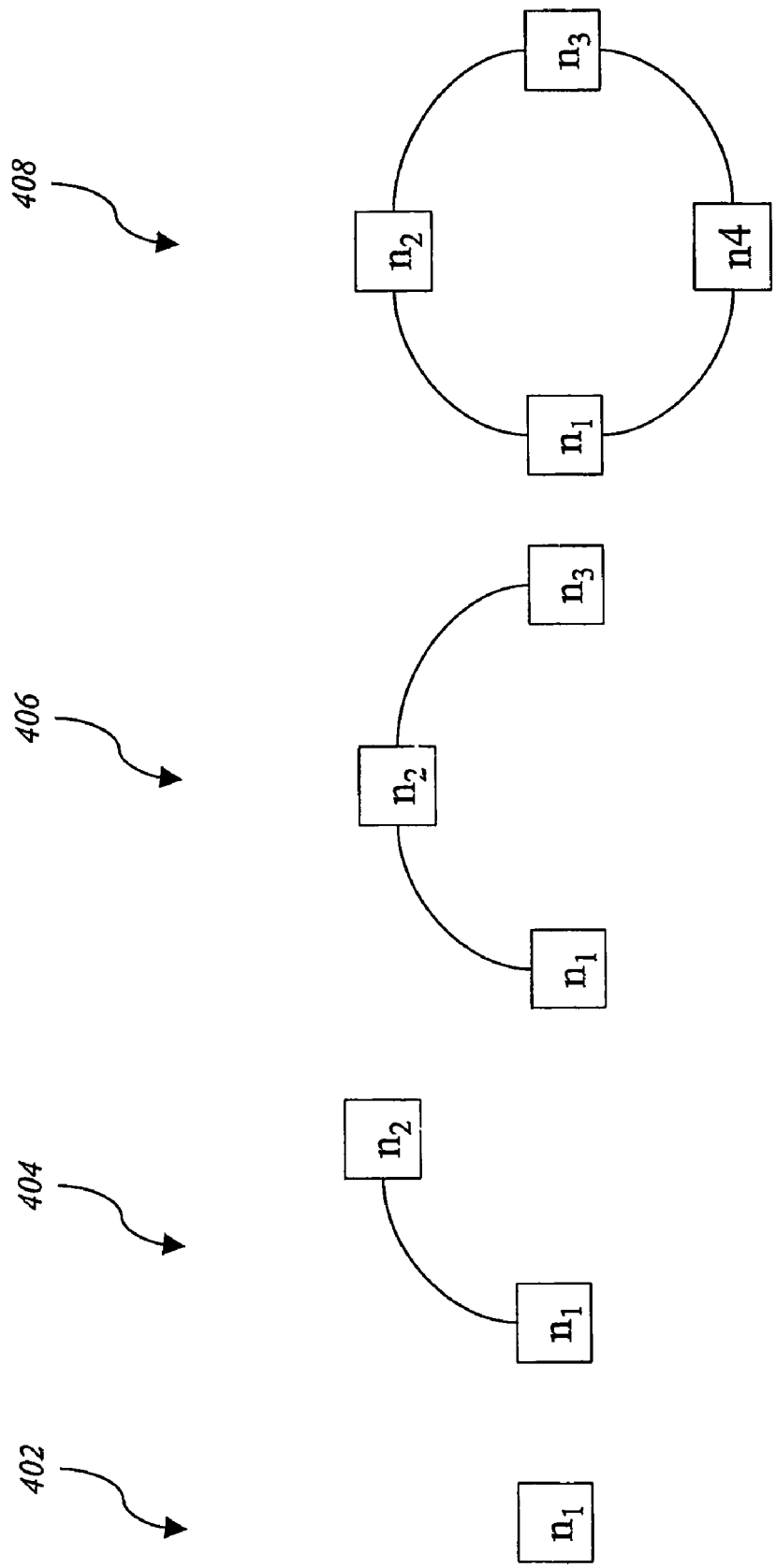
FIG. 4 is a block diagram illustrating the process of forming a collective in one embodiment of the present invention.

FIG. 4 is a block diagram illustrating the process of forming a collective. In describing the various interactions involved, the following convention will be used. If node A is sending a message $m_i$ to node B, the protocol description for that interaction is described like this: $A \rightarrow B$: $m_i$.

FIG. 4 illustrate a four-node collective, with nodes $n_1$, $n_2$, $n_3$, and $n_4$ being introduced to the collective in that order. The systems administrator 402 first sets up n1 manually. This effectively starts a collective, with only $n_1$ as the only node in the collective. To add $n_2$, the administrator sets $n_2$ up to join the collective started by $n_1$ 404. $n_2$ sends $n_1$ a join message <join, $n_1$, $n_2$>. The message states $n_2$'s intent to join the collective started by $n_1$. $n_1$ accepts the message and acknowledges it with an ack message <ack, $n_1$, $n_2$, link, $n_1$>. This second message has a subcommand link and an argument $n_1$. This subcommand informs $n_2$ to link to $n_1$ as the next node in the collective. Since $n_1$ is the only node in the collective, this is expected. The protocol steps are as follows:

$$n_2 \rightarrow n_1 : m_1 = <\text{join}, n_2, n_1>$$

$$n_1 \rightarrow n_2 : m_2 = <ack, n_1, n_2, \text{link}, n_1>$$

Likewise, when $n_3$ intends to join the collective 406, it may choose to state its intent to $n_2$ through the join message. However, this time the ack message has a link subcommand with $n_1$ and $n_2$ as the arguments. This means that $n_3$ is supposed to link itself with $n_1$ and $n_2$:

$$n_3 \rightarrow n_2 : m_3 = <\text{join}, n_3, n_2>$$

$$n_2 \rightarrow n_3 = <ack, n_2, n_3, \text{link}, n_1, n_2>$$

The same types of messages are exchanged when $n_4$ joins the collective 408. Each node $n_i$ keeps track of its neighboring nodes (the nodes before and after it) $n_{i-1}$ and $n_{i+1}$. Each node learns the list of nodes in a collective by looking at the message exchanges when new nodes are added to the collective. This way, each node can keep a table of all other nodes in the collective. This is useful in the subsequent recovery phase.

Initiating and forming a supernode collective is similar to the process described in the previous subsection. The key difference is that the nodes in this case are explicitly set to be supernodes by the IDF agents running on the hosts. Apart from this difference, the initiation and formation of a supernode collective is the same as that of a normal collective.

To register a collective to a supernode collective, a representative node from that collective will send the "register" message to a supernode. The supernode will then register it with the supernode collective that the supernode is in. The representative node that sends the message is known as the forwarding node. Each node has the capability to be a forwarding node. The forwarding node is selected using an automatic "election" process, in which the nodes in a collective select a single node based on certain criteria. The idea is similar to how the spanning tree algorithm works in selecting a root node in learning bridges. The forwarding node that has been elected in a collective, which will be identified as F.

For example, suppose we have a four-node collective C with nodes $n_1$, $n_2$, $n_3$, and $n_4$, where $F=n_2$ (meaning $n_2$ has been elected as the forwarding node). We will now describe the protocol to register C with a supernode collective D, which consists of four supernodes, $S_1$, $S_2$, $S_3$, and $S_4$. In the first step, F will send a register message to any of the supernodes, say $S_3$. The message sent is <register, $n_2$, $S_3$, represent, C, D, $n_1$, $n_3$, $n_4$>. The subcommand "represent" is used to state that the forwarding node represents the collective C, which consists of three other nodes $n_1$, $n_2$, and $n_4$, and the intention is to register with supernode collective D. Since $n_2$ is the source of the message, it is implied that it is also represented in the collective C. Upon receiving the register message, supernode $S_3$ responds with an ack message <ack, $S_3$, $n_{1\ldots 4}$, register, D, C, $n_2$> to each of the nodes $n_{1\ldots 4}$. The protocol steps are as follows:

$$n_2 \rightarrow S_3 : m_1 = <\text{register}, n_2, S_3, \text{represent}, C, D, n_1, n_3, n_4>$$

$$S_3 \rightarrow n_1 : m_2 = <ack, S_3, n_1, \text{register}, D, C, n_2>$$

$$S_3 \rightarrow n_2 : m_3 = <ack, S_3, n_2, \text{register}, D, C, n_2>$$

$$S_3 \rightarrow n_3 : m_4 = <ack, S_3, n_3, \text{register}, D, C, n_2>$$

$$S_3 \rightarrow n_4 : m_5 = <ack, S_3, n_4, \text{register}, D, C, n_2>$$

In one embodiment of the present invention, the recovery part of the communications and recovery subsystem handles operations such as data replication and assisting a collective to recover from node failures. Data replication is used to introduce redundancy to minimize the impact of data loss in the event of a node failure or denial of service attack. If a node does fail (whether due to an attack or hardware failure), the communication and recovery subsystem initiates reconstruction of a collective. One embodiment of the recovery operation can be seen in FIG. 9. In the diagram, a four-node collective 406 has a member, $n_1$, that suddenly fails 404. The neighboring nodes of the failed node, $n_2$ and $n_4$, detect this failure and change their states, thereby forming a temporary collective 406. The failed node subsequently recovers. It communicates with its former neighbors and reinstates itself 408, which results in the reconstructed collective 410. This is just one approach that may be used; more complex embodiments implement more sophisticated recovery schemes.

Figure 6:
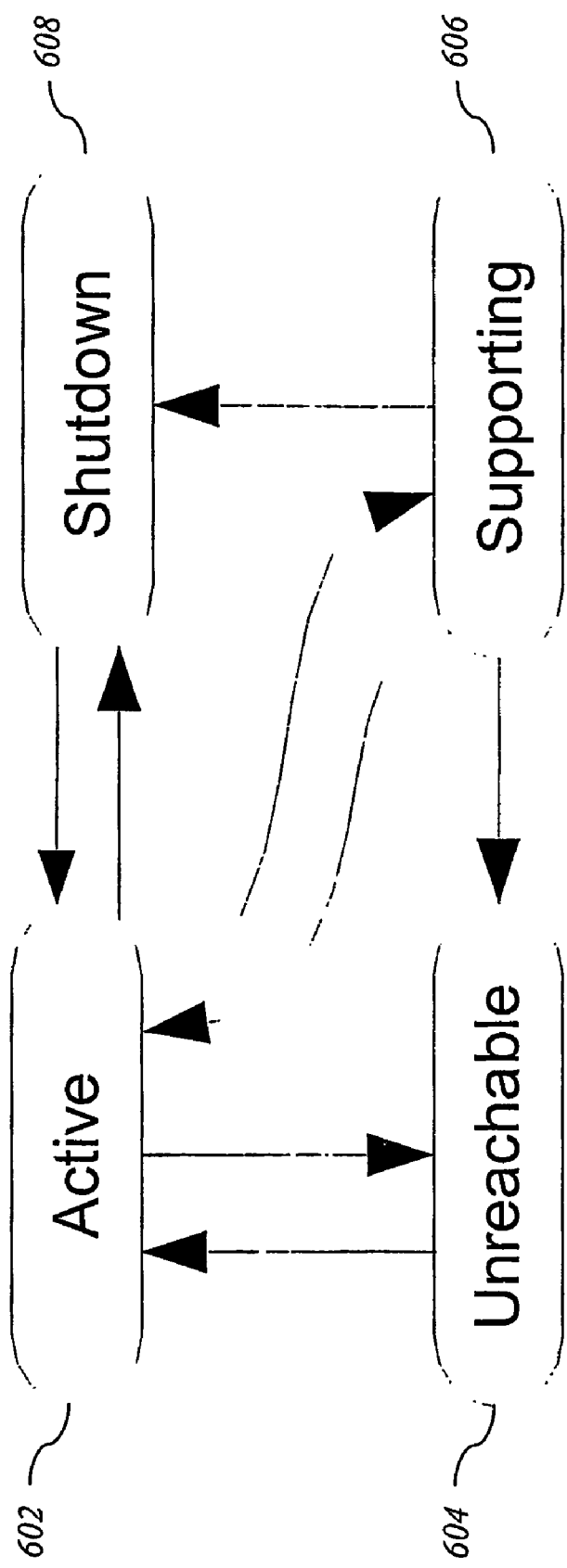
FIG. 6 is a state transition diagram representing the states of a node or supernode in one embodiment of the present invention.

In embodiments of the present invention, recovery is aided by supporting states in the nodes. In one such embodiment, each node can be in one of four possible states at any one time—Active 602, Unreachable 604, Supporting 606, or Shutdown 608. A state transition diagram is illustrated in FIG. 6. A node is in the active state if it is running normally without any problems. A node that has failed will be in an unreachable state. Since the nodes in a collective are arranged according to a ring topology, it is vital that nodes are able to communicate with each other despite a failed node in the ring. Therefore, if a node is in an unreachable state, its neighboring nodes have to re-establish communication with one another. These neighboring nodes are then said to be in the supporting state. For example, if node $n_i$ fails and goes into an unreachable state, $n_{i-1}$ will detect this and establish communication with $n_{i+1}$. Nodes $n_{i-1}$ and $n_{i+1}$ are then said to be in the supporting state. The last state, shutdown, is used when a node is deliberately and legitimately shut down. When this happens, its state is set to shutdown and it will explicitly inform its neighboring nodes of this change. The neighboring nodes will then re-establish communication in the same way described before.

It should be noted that the states presented here do not involve the issue of time. The state only represents the current status or snapshot of the collective. In the embodiment shown, time (or history) is not considered because it will only add to the complexity of the collective. In other embodiments, time is a consideration.

As described above, each node keeps track of the node before and after it is in the collective to aid reconstruction. Additionally, each node keeps a state of all the other nodes in the collective. For example, each node $n_i$ in a four-node collective, such as the collective illustrated in FIGS. 4 and 5 keeps track of its neighbors as well as the nodes in the collective:

$$n_1:s_1 = <n_4, n_2>(n_1, n_2, n_3, n_4)$$

$$n_2:s_2 = <n_1, n_3>(n_2, n_3, n_4, n_1)$$

$$n_3:s_3 = <n_2, n_4>(n_3, n_4, n_1, n_2)$$

$$n_4:s_4 = <n_3, n_1>(n_4, n_1, n_2, n_3)$$

For example, node $n_2$ keeps track of its neighboring nodes $n_1$ and $n_3$. It also knows the other nodes in the collective in order, beginning from itself: $n_2$, $n_3$, $n_4$, and $n_1$.

A collective has to reconstruct itself to allow it to continue functioning in the event that a node fails. To support reconstruction, each node in the collective keeps track of the order of the other nodes. When a node fails, the nodes before and after the failed node will find out that the node has failed. This is discovered by periodically polling the state of neighboring nodes using the ping-like CheckState messages that the nodes send to each other.) The nodes before and after the failed node redirect the traffic they are sending so that the collective's ring shape will be preserved.

Figure 5:
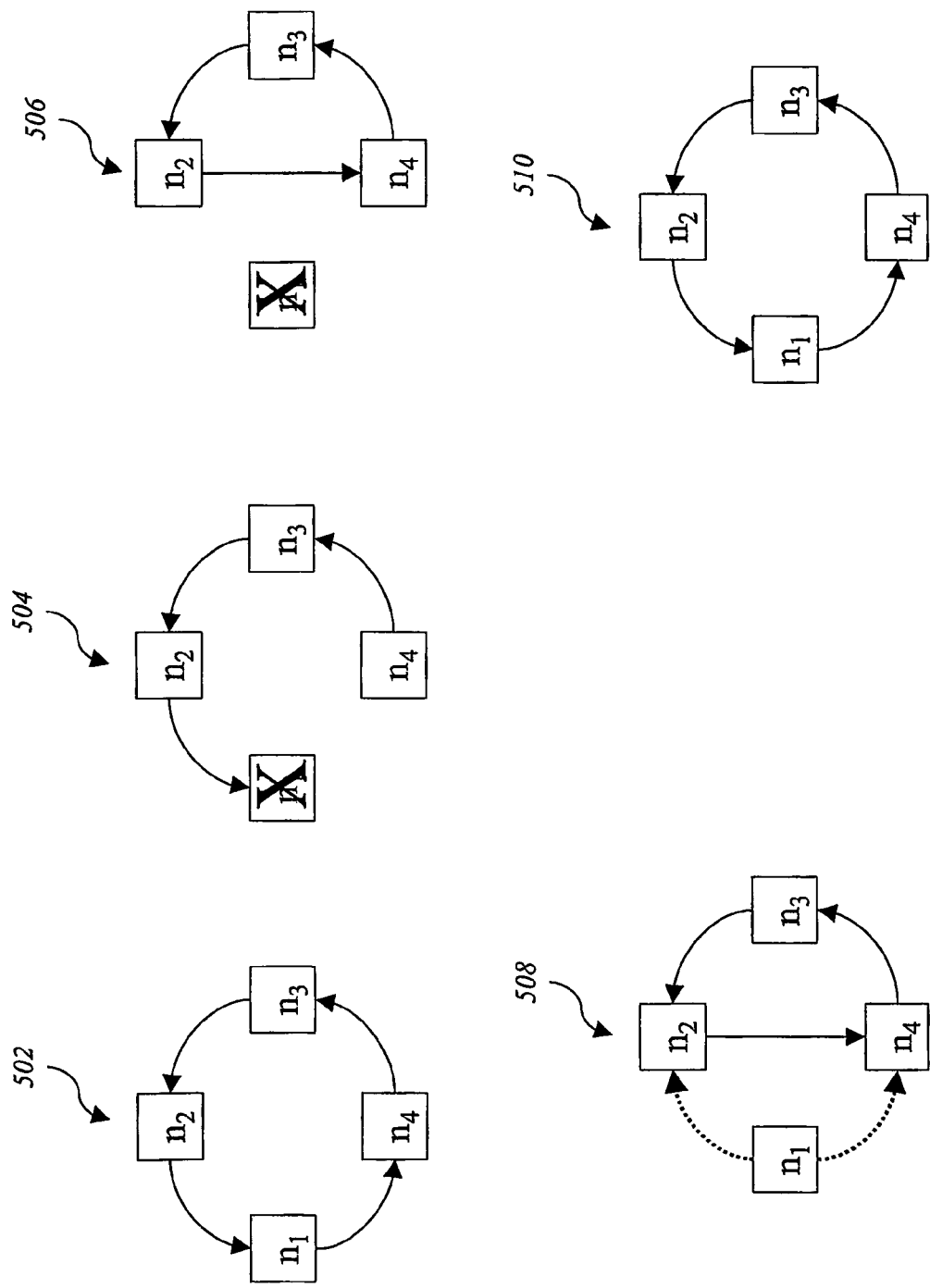
FIG. 5 is a block diagram illustrating a collective undergoing reconstruction in one embodiment of the present invention.

Reconstruction can be more clearly explained with reference to the embodiment shown in FIG. 5. Collective 502 is a normal, completely functioning collective with four nodes. Initially all nodes are in the Active state. When one of the nodes fail (the failed node is shown as the crossed-out node 504), the nodes before and after it will send their traffic directly to each other instead 506, resulting in only three of the remaining functioning nodes sending traffic to each other. At this stage, the nodes before and after the failed node will set their state to Supporting, and the state of the failed node will be set to Unreachable. It should be stressed that the remaining nodes in the collective do not entirely "forget" the failed node. They merely flag the state of that failed node as Unreachable until it is revived at a later time.

In one embodiment of the present invention, a recovery phase is performed when the failed node is revived. In the recovery phase, the revived node sends the CheckState message to its neighboring nodes, with a subcommand stating that it has been revived (shown by the dotted lines in 508). Upon receiving the new CheckState messages from the revived node, the nodes reset their traffic directions and the collective once again recovers to its normal functioning state 510, which is similar to the original state 502.

For example, when a failed node $n_i$ is revived, it will send CheckState messages to the supporting nodes $n_{i-1}$ and $n_{i+1}$. $n_{i-1}$ will then re-establish communication with $n_i$, and $n_i$ will re-establish communication with $n_{i+1}$. This will bring the collective back to the original functioning state 502.

FIG. 7 is a pseudocode listing for a process of reconstruction and recovery in one embodiment. In the embodiment shown, each node in the collective periodically polls for received messages and the state of the next node, to see if reconstruction or recovery is required.

An embodiment of the present invention implements security and privacy. Information sharing in an IDF according to the present invention is carried out using nodes that forward messages to one another. Intermediary nodes may be used in transit. For example, for node A to send a message to node D, the message might need to pass through nodes B and C. An attacker attempting to monitor or disrupt the IDF may utilize one of the following approaches:

1. Cryptanalysis of the IDF cryptographic mechanisms. An attacker may attempt to cryptanalyze the encrypted messages to illegally obtain the content in those messages.
2. Eavesdropping. The main form of attack that the attacker uses is eavesdropping on traffic. From the data gathered from eavesdropping sessions, the attacker attempts to analyze traffic in order to gather intelligence for further attacks, which are described in the following points. The aim is to identify what IDF zones/nodes/collectives are encountering problems so that attacks can be launched against those entities.
3. Message fabrication. The attacker attempts to fabricate messages in order to confuse or pollute IDF nodes with bad data.
4. Denial-of-service attacks against nodes. The attacker uses information learned from traffic analysis to conduct denial-of-service attacks against nodes. The objective of this may be to prevent the said node from propagating data to other nodes, or to disable the node from receiving data from other nodes.

In an embodiment of the present invention, security encompasses the confidentiality and integrity of messages and nodes in the IDF. Confidentiality refers to the objective of ensuring that the content of the IDF messages be kept hidden from unauthorized parties. In addition, confidentiality deters attackers from finding out which nodes are communicating with each other based on attacks such as traffic analysis. It should be noted that the privacy research community refers to protection against traffic analysis as privacy. However, in the context of the IDF, it is clearer to state this concept as a security concern.

Integrity ensures that the IDF messages themselves are received in the same form as they were sent from the sender; that is, the messages are not fabricated or modified in transit. To counter the attacks in the attack model, the privacy mechanisms in an embodiment of the present invention allow unlinkability and unobservability. Unlinkability in the IDF context deters attackers from establishing the link between two nodes. Unobservability deters attackers from observing that the resources and services of a node are being used.

An embodiment of the present invention may use anonymity or pseudonymity to protect against traffic analysis and to achieve unlinkability. Since the IDF requires nodes to participate in exchanges with each other, these nodes are held accountable for their actions. Accordingly, one embodiment of the present invention utilizes pseudonymity techniques instead of anonymity. Pseudonymity has been proposed before in intrusion detection literature, such as in Biskup and Flegel (2000) (J. Biskup and U. Flegel. "Transaction-Based Pseudonyms in Audit Data for Privacy Respecting Intrusion Detection", *Proceedings of the 3rd International Workshop on Recent Advances in Intrusion Detection*, Toulouse, France, October, 2000, pp. 28-48). Biskup and Flegel proposed transaction-based pseudonyms that 3 substitute real identifiers. They adapted Shamir's cryptographic approach to represent the pseudonym as a share. Under sufficient suspicion (which is expressed as a threshold on the share), audit analyzers can perform reidentification. Their approach was tested on a single host; in contrast, an IDF according to the present invention requires pseudonyms in a large-scale manner.

One embodiment of the present invention includes an audit reduction component. Being an Internet-scale system, the IDF generates much traffic. While security mechanisms emphasize ways to prevent an attacker from gaining information about a typical transaction, they also have the potential to generate a lot of traffic due to their techniques, such as dummy traffic generation and multi-path routing. Therefore, the audit reduction component reduces the amount of traffic or the duration of storage of this traffic within the IDF.

Also, an embodiment of the present invention balances the need for security with a need for speed. In order to enable secure communications between nodes, features are introduced, such as multiple hops between the source and the recipient. These features reduce the speed at which message reaches the recipient. Accordingly, an embodiment of the present invention balances the need for timely information with the need for adequate security.

The Communications and Recovery Subsystem according to the present invention is designed to support security in the IDF. One embodiment of the present invention utilizes authentication and encryption to support security at the communications level.

In one embodiment of the present invention, public key infrastructure (PKI) is used for authentication throughout the entire IDF. IDF software agents are distributed with the public key certificate of the root certificate authority (CA). A formal verification process identifies the nodes. And digital signatures are used to authenticate nodes.

In another embodiment, all messages are encrypted using a fast symmetric encryption algorithm. Key exchanges are performed using public keys.

As discussed herein, one embodiment of the IDF according to the present invention uses two methods to identify nodes. The first is a public 128-bit address for its nodes, while the second is a pseudonym that can either be permanent or temporal in nature. The pseudonym can be thought of as a logical IP address. An example of a temporal pseudonym is as follows: Suppose Node A would like to communicate with Nodes B and C, but would not like Nodes B and C to know that they are communicating with it. Node A would then use a temporal pseudonym A' with B, and another temporal pseudonym A" with C. Pseudonyms are used for both security and privacy.

In an embodiment of the present invention, routing is performed intelligently to avoid traffic analysis. For example, in one embodiment, intelligent routing is implemented in the routing hints field in the message header.

In one embodiment, to help prevent traffic analysis, the size of the IDF messages is fixed. Regardless of whether the message is a control or data packet, the size will be the same. To make this technique effective, the number of all possible message payload contents is evenly distributed. Also, while some messages are more important than others, because of encryption, an attacker is not able to analyze the traffic based on these prioritized messages.

An embodiment of the present invention employs various techniques to protect the header fields, as described above, from attack. The routing hints consist of a block of an encrypted message, which provide hints on where to route the message. In order to confuse the attacker, one embodiment of the present invention includes a cryptographic mechanism here, where multiple parties can decrypt the hint, but only one of them will be the right one. For example, Node A is trying to communicate with E, and the right route is Route R3 that consists of intermediary nodes B, C, and D. The message includes a routing hint H, which when decrypted, would produce:

$R1: P \rightarrow Q \rightarrow R \rightarrow S$ $R2: N \rightarrow O \rightarrow P \rightarrow Q$ $R3: B \rightarrow C \rightarrow D \rightarrow E$ (the right route)

$R4: W \rightarrow X \rightarrow Y \rightarrow Z$

In this manner, the message is propagated along all routes, but only reaches its recipient on the correct route. In another embodiment, intermediary nodes forward the messages to a random node periodically. Routing hints are sensitive to the priority. For example, in one embodiment, the recipient is an intermediary node, which forwards the high-priority message even after it has received and decrypted it. For example:

$R5: B \rightarrow C \rightarrow E \rightarrow F \rightarrow G$

E continues forwarding the high-priority message on to F. The attacker is unable to discern that the message has reached its recipient.

To further confuse an attacker attempting to perform timing analysis, the nodes in one embodiment forward the messages with relatively uniform delays (for example, if the average time for nodes to forward data is t, but if the correct recipient node always takes $t+\alpha$ to decrypt and forward the node, then the attacker has reasonable suspicion that it has found the recipient node). In another embodiment, the delays are randomized.

The sender field of the header consists of a source pseudonym encrypted by the recipient's public key, so that only the recipient is able to identify the source. To save space (and depending on the size of the pseudonym), one embodiment utilizes a hash to reduce the size of the field. The recipient field is also encrypted by recipient's public key, so that the recipient is able to determine that it is the intended recipient.

The priority field contains the priority that is assigned to the message. An attacker may attempt to learn about the communications between different nodes by analyzing traffic with high priority. One way to counter this is to enable the node to pre-determine various routes that can guarantee high-priority (I will call this type of routes a "priority route"). These priority routes can be discovered using a discovery protocol initiated by the node. A simple discovery protocol would involve the transmission of a message to a destination node using a particular route. The response time from the destination node is then calculated to assess whether the route is able to support high-priority messages or not, i.e. whether it can be identified as a priority route. By initiating the discovery protocol a number of times to different nodes, the node can then assemble a list of priority routes. When sending high-priority messages, the node can either choose a priority route randomly, or choose a priority route that is suitable for a message with a particular priority. For example, an urgent message may require a high-speed priority route, while an important message may be assigned a route that is not as fast as the former route. When a node assembles a large list of priority routes along with their categories (e.g. PR1 and PR2 are high-speed priority routes; PR3 and PR4 are medium-speed, etc.), and uses a different or random priority route each time for high-priority messages, the attacker would not be able to distinguish which messages are high priority and which are not. The attacker may be able to observe a few particular priority routes but not all the ones assembled by the sender, since the IDF is deployed globally and it is infeasible for a single attacker to monitor global traffic. The use of routing hints, described above, would confuse the attacker further. The message also includes a payload. In one embodiment, the message payload is encrypted using a session key. The payload includes control and data fields. A control payload contains commands and instructions that are used for the higher-level communication and recovery protocols. Data consists of either audit records (records of interesting events that have already happened), or traffic information. Both types of data have differing levels of sensitivity. In embodiments of the present invention, these sensitivities influence the level of security used for a particular message.

One embodiment of the present invention includes mechanisms for countering message fabrication. For example, in one embodiment, temporal pseudonyms address the message fabrication-type attack. For example, in one embodiment, node A uses pseudonym p with B, and q with C. B does not know about q and C does not know about p. If C is malicious and attempts to forge a message from B to A, C does not know the correct pseudonym to use. If it mistakenly uses q, e.g., C thinks that permanent pseudonyms are being used, then A quickly identifies that the pseudonym is wrong and rejects the message as having been fabricated.

An embodiment of the present invention may also employ techniques to counter traffic analysis. For example, one embodiment uses random starting nodes, where nodes send a dummy, starting message to another node. If the other node has a message to send, it would then use this message as its carrier and forward it to the next node. For example, B intends to send a message to D. A generates a dummy starting message and sends it to B. B then forwards this message to C, and then D. To an observer, it would look as though A was the sender and D was the recipient. D may also continue forwarding a dummy, ending message to E, thus confusing an attacker even further. Routing hints, such as those described above, also help in countering traffic analysis.

An embodiment of the present invention may also provide privacy mechanisms. Since organizations usually have consistent internal privacy policies, and embodiment of the present invention focuses primarily of information provided to or accessed by those outside the organization.

Privacy enhancing technologies are generally classified into a few broad categories, including anonymity, pseudonymity, unobservability, and unlinkability. The selection of the appropriate technology depends on the attack model that is used.

An attacker of an embodiment of the present invention may use one of several techniques to attack the IDF, including the following:

1. Non-global attacker. Since the IDF is deployed on an Internet scale, it is not practical for an attacker to observe traffic on a global scale. At most, an attacker may only observe the traffic on several collectives.
2. Uncooperative node. The attacker may attempt to set up a malicious node that either attempts to transmit incorrect messages to other nodes, or not pass messages at all.
3. Misuse of received messages. The administrator of that node may misuse messages received by a legitimate node.

To satisfy privacy requirements in an embodiment of the present invention, the IDF limits information based on two levels: Individual pieces of information, and Collections of information (which, if not addressed by privacy mechanisms, aids the attacker in establishing linkability).

Countering linkability has been addressed above and is not repeated here.

One embodiment of the IDF according to the present invention allows multi-level privacy, which allows organizations to customize their privacy and information sharing policy within the infrastructure. The multiple levels of privacy allow customization of the data to share (the message payload portion).

Reiter and Rubin (1997) (M. Reiter and A. Rubin. "Crowds: Anonymity for Web Transactions", *DIMACS Technical Report* 97-15, 1997), who developed AT&T Crowds, discuss multi-level privacy. Reiter and Rubin suggest four degrees of anonymity. Although designed for anonymity, this Reiter/Rubin scheme is utilized by one embodiment of the IDF. The Reiter/Rubin degrees of anonymity are shown in Table 2.

TABLE 2

Reiter/Rubin degrees of anonymity. (Source: Fischer-Hubner, 2001)

| Degree of Anonymity | Description |
|---|---|
| Beyond Suspicion | A sender's (receiver's) anonymity is beyond suspicion if even though the attacker can see evidence of a sent (received) message, the sender (receiver) appears no more likely to be the originator (recipient) of that message than any other potential sender (receiver) in the system. |
| Probable innocence | A sender (receiver) is probably innocent (or better: not involved) if, from the attacker's point of view, the sender (receiver) appears no more likely to be the originator (recipient) than not to be the originator (recipient). This is weaker than beyond suspicion in that the attacker may have reasons to expect that the sender (receiver) is more likely to be involved than any other potential sender (receiver), but it still appears, at least as likely, that the sender is not responsible. That is, the probability that the sender (receiver) is involved is less or equal to 0.5. |
| Possible innocence | A sender (receiver) is possibly innocent if, from the attacker's point of view, there is a nontrivial probability that the real sender (receiver) is someone else. |
| Provably exposed | The identity of a sender (receiver) is provably exposed if the attacker cannot only identify the sender (receiver), but can also prove the identity of the sender to others. |

Embodiments of the present invention balance the need for privacy with the resources required in adopting a particular level of privacy. An embodiment implementing the "Provably Exposed" level essentially does not provide privacy. While an embodiment implementing the "Beyond Suspicion" level requires a great deal of network and system resources to support. In fact, such an embodiment may result in a situation analogous to a denial-of-service attack An embodiment implementing the "Probable Innocence" level is the most practical. At this level, the attacker has trouble identifying which nodes are communicating with which other nodes, since the probability of a node's participation in a communication is less than or equal to 0.5. And the resources required to support the level of privacy are not cost prohibitive in terms of time and money.

In embodiments of the present invention nodes share their pseudonym with other nodes. In one embodiment, a new node broadcasts its presence to other nodes, initiating a setup phase in which the other nodes query the new node for its pseudonym. In such an embodiment, the new node challenges other nodes to prove the authenticity of their requests to the new node.

The characteristics of the pseudonym are subject to constraints that would support the privacy requirements mentioned above. For example, the pseudonym is relatively short, but long enough to avoid clashes between identical pseudonyms. Also, in one embodiment, the pseudonym is encrypted with the public key of the intended recipient, so that it can be identified.

An embodiment of the present invention may employ various strategies to protect privacy between nodes. Privacy strategies address various issues. For example, in one embodiment, the privacy strategies address countering misuse of received data. This attack is probably the most challenging to address, since it involves a "legitimate" node whose user is malicious. In the real world, commercial enterprises are always be concerned about misuse of information. In one embodiment, administrators of participating nodes/supernodes/collectives/super-collectives/zones are required to sign non-disclosure confidentiality agreements, rather than relying on technological approaches. In another embodiment, an organization sets a sharing level on a node based on the organization's "comfort level" with the IDF. The ability to customize policies is described below in relation to multi-level privacy.

Another embodiment provides strategies to deal with uncooperative nodes. Uncooperative nodes are those that appear legitimate but refuse to participate in routing a message. To address this, multiple routes can be used when starting a communication. Instead of relying on just one route, the starting node can initiate many routes so that the message has higher chances of reaching the recipient, even if there are uncooperative nodes in between.

Another embodiment employs random routing. Random routing utilizes intermediary nodes to form new routes of their own, thus giving the message higher chances of successfully reaching recipients. In such an embodiment, the resources required for random routing are balanced against overall performance of the network.

Another embodiment of the present invention provides multi-level privacy. In such an embodiment, the IDF uses levels to limit information sent from certain nodes. This is somewhat analogous to how Crowds (discussed above) uses levels to achieve anonymity. However, as stated above, Crowds uses levels to deter the attacker from establishing a link between a source and destination, rather than limiting information sent from nodes.

The privacy levels in the IDF consist of individual privacy items. These privacy items are primitive data items that represent individual network-related information that can be shared. These privacy items can then be grouped together into privacy levels. Table 3 illustrates privacy items in one embodiment of the present invention.

TABLE 3

Privacy Items.

| Privacy item tag | Description |
| --- | --- |
| IDENT_SRC | Allow the IDF to identify the source of the attack. |
| IDENT_DEST | Allow the IDF to identify the destination of the attack. |
| IDENT_CAT | Allow the IDF to identify the category of attack. |
| IDENT_TYPE | Allow the IDF to identify the specific type of attack. |
| DUMMY | Generate dummy traffic to thwart traffic monitors. |
| ALLOW_PAYLOAD | Allow the IDF to divulge payload content. |
| ALLOW_TRAFFIC | Allow the IDF to divulge full traffic content. |
| ALLOW_HEADERS | Allow the IDF to divulge message headers only. |
| ALLOW_ATTACK | Allow the IDF to divulge full attack content. |

Note that some of these items are interdependent. For example, in the embodiment shown, it is not possible to allow the IDF to divulge message headers (ALLOW_HEADERS) without it also identifying the source of the attack (IDENT_SRC).

For example, one privacy level might consist of IDENT_SRC+IDENT_CAT, which simply means that the organization is interested in sharing the source of the attack and the category of the attack only. If a level has one item but does not want another, the unwanted item would be masked out.

One embodiment includes a number of privacy levels, for example four, that are universally referred to, similar to the Evaluation Assurance Level (EAL) levels of the Common Criteria. When defining these privacy levels, two criteria are taken into account: what information to share (the goals), and what mechanisms would be used to achieve those goals. The information to share is represented by the privacy items discussed above. Table 4 illustrates an embodiment having four privacy levels, along with which privacy items make up each level, and the mechanism to achieve them.

TABLE 4

Privacy Levels.

| Privacy Level | Privacy Items | Mechanism |
| --- | --- | --- |
| Maximum | IDENT_SRC | Masking |
|  | IDENT_CAT | Masking |
| High | IDENT_SRC | Masking |
|  | IDENT_CAT | Masking |
|  | IDENT_TYPE | Masking |
|  | DUMMY | Dummy traffic generation |
| Low | IDENT_SRC | Masking |
|  | IDENT_DEST | Masking |
|  | IDENT_CAT | Masking |
|  | IDENT_TYPE | Masking |
|  | DUMMY | Dummy traffic generation |
|  | ALLOW_HEADERS | Preprocessing |
| Minimum | IDENT_SRC | Masking |
|  | IDENT_DEST | Masking |
|  | IDENT_CAT | Masking |
|  | IDENT_TYPE | Masking |
|  | DUMMY | Dummy traffic generation |
|  | ALLOW_PAYLOAD | Preprocessing |
|  | ALLOW_TRAFFIC | Preprocessing |
|  | ALLOW_HEADERS | Preprocessing |
|  | ALLOW_ATTACK | Preprocessing |

Figure 8:
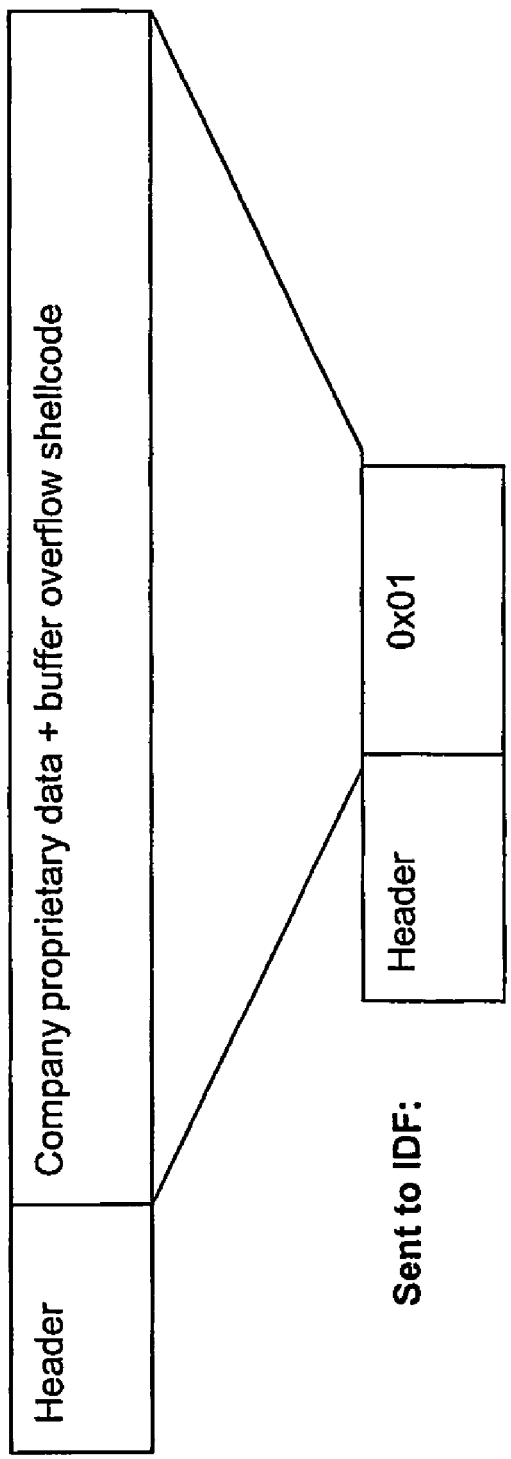
FIG. 8 is a block diagram illustrating a privacy mechanism in one embodiment of the present invention.

In one such embodiment, the following mechanism is utilized. The IDENT_TYPE item is used, which is difficult to use without disclosing the payload content. In one such embodiment, the IDF uses a hash or encoding of the payload content. For example, the code 0x01 is used for buffer overflow shellcode and 0x02 shows a web scripting attack. If the buffer overflow shellcode is intermingled with actual sensitive company content, an analysis can be done to determine the shellcode and just encode the attack as type 0x01. This is illustrated in FIG. 8. Similarly, if it is a web scripting attack, it can be encoded as 0x02. Hashing can also potentially be used for certain situations, especially in those where uniqueness of the content needs to be identified (say, trying to correlate an attack involving the use of the same password in two locations, but we do not want to reveal what the password is).

In another embodiment, a rather primitive method for supporting IDENT_SRC is implemented, stripping the destination IP addresses to determine the source of an attack only. In another embodiment, dummy traffic is sent during times of low network traffic to prevent traffic analysis. In such an embodiment, it is preferable to not send dummy traffic at all times because of the bandwidth required.

This section shows how the IDF will detect and respond to three types of attacks from these categories: the island-hopping attack (used to evade detection), the decoy port scan (used for information gathering), and the distributed denial of service (DDoS) attacks (distributed attack and denial of service). These attacks are chosen as examples for this section because they clearly illustrate why the IDF would be more effective at detecting them compared to conventional IDSs. Note that the IDF is by no means limited only to detecting these attacks. It can be extended to address the other categories of intrusions as well. In addition, new algorithms can be developed for the IDF to detect and respond to new and future types of attacks.

Figure 9:
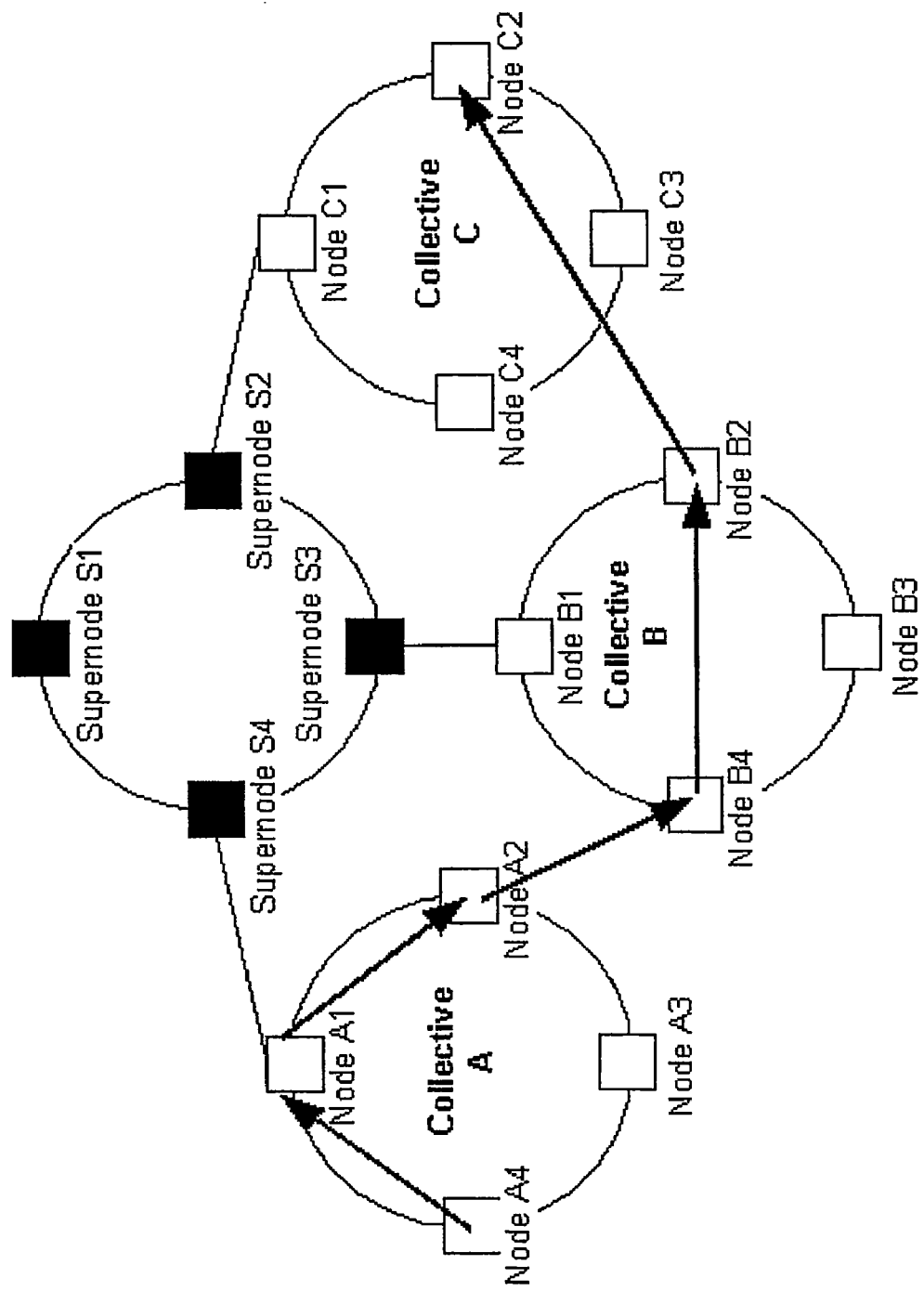
FIG. 9 is a block diagram illustrating how one embodiment of the present invention detects and responds to an "island-hopping" attack.

FIG. 9 is a block diagram illustrating how the IDF detects and responds to an "island-hopping" attack. The arrows show the chain of logins an attacker uses to evade detection before launching the final attack on Node C2.

Attackers use the island-hopping attack to evade detection. An island-hopping attack requires the attacker to break into many machines as follows. First, the attacker logs in to the first machine, and uses it to connect to the next. From the next machine, the attacker logs in to yet another machine, and so on, thereby forming a chain of connections. From the last machine, the attacker attacks the intended target. Therefore it would be difficult for the target to figure out the actual source of the attack, since the attacker used a long chain of connections.

FIG. 9 shows a supernode collective with three collectives registered under it. The arrows show the attacks that a typical attacker may perform. First, the attacker breaks into Node A4, and from Node A4, the attacker logs into Node A1. From Node A1, the attacker continues the chain of connections to Node A2, B4, and B2. Finally, the attacker uses Node B2 as a launch pad to attack the intended target, Node C2.

If conventional IDSs were used, the organization running Collective A would only be able to detect the attacks happening at Collective A. It would not be able to detect any intrusions at Collective B. Furthermore, if the IDS used is host-based without any correlation capabilities, the IDS deployed on Node A4 will not be able to tell that Node A1 and A2 are being compromised in the same pattern as well.

However, with an IDF according the present invention, a clearer picture of the attack patterns would emerge. First, since the nodes in each collective share information with each other, they are able to correlate the attack patterns more effectively. Therefore, Collective A is able to identify the chain of logins from Nodes A4, A1, and A2. Collective A would then submit its findings to the supernode collective. Likewise, Collective B is able to identify the link between Nodes B4 and B2, and Collective C on the attack on C2. The collectives send their results to the supernode collective, where higher-level correlation can be performed. The supernode collective will then be able to identify that the entire chain of attacks from Node A4 to Node C2. The results can then be sent to the systems administrators of each organization and appropriate investigative authorities.

Figure 10:
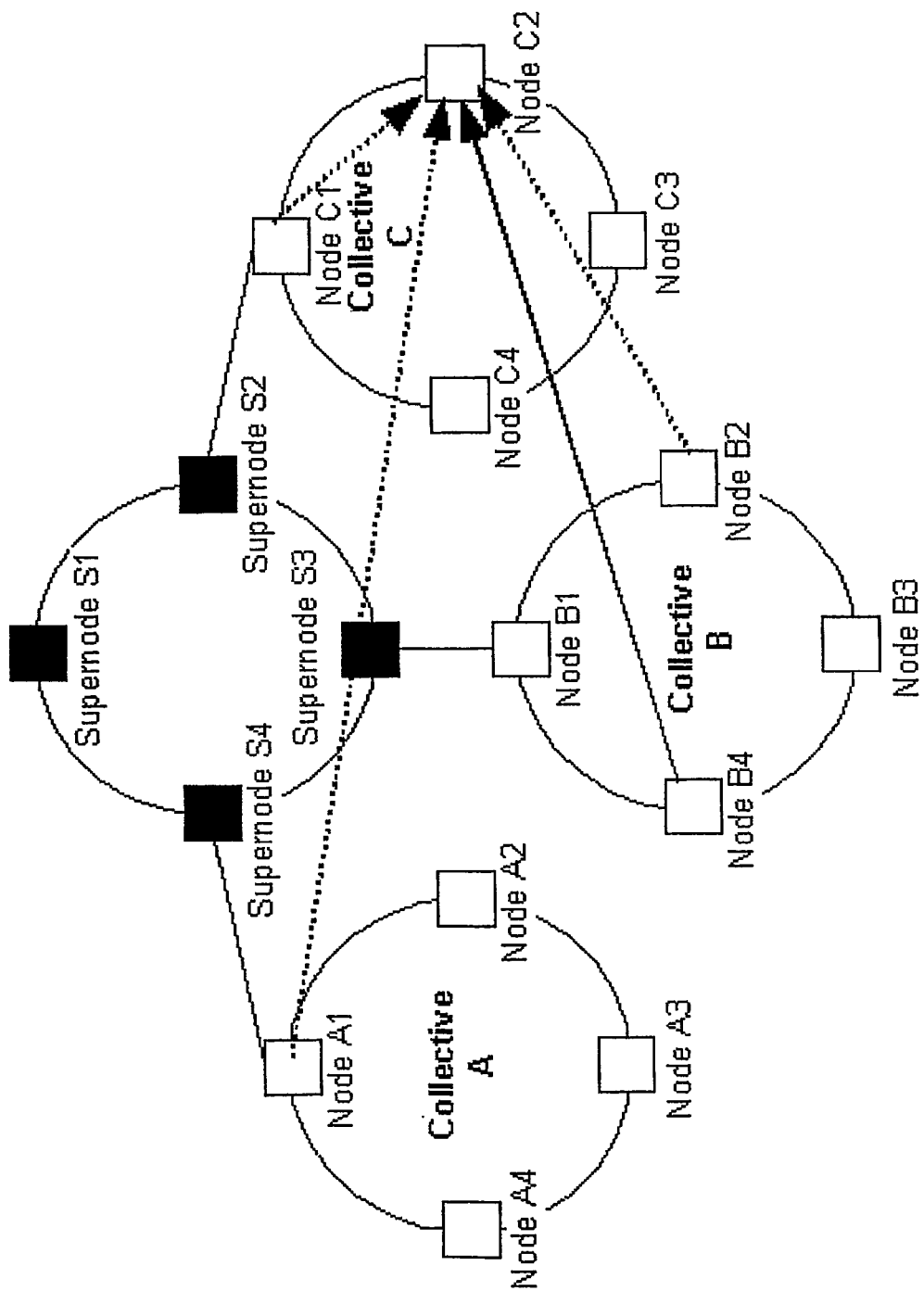
FIG. 10 is a block diagram illustrating how one embodiment of the present invention detects and responds to a decoy port scan attack.

FIG. 10 is a block diagram, illustrating how the IDF detects and responds to a decoy port scan attack. The solid black arrow represents the actual port scan, while the dashed arrows represent decoy port scans.

A decoy port scan is a technique used by attackers to gather information about a host prior to an actual attack. It is analogical to a thief twisting a doorknob to see if the door is locked or not. Among the types of information that an attacker can gather during a port scan are the services running on the target (e.g., web server, mail server, etc.), the operating system used, and sometimes the firewall rules used to prevent unauthorized access to the target. It is important to consider and detect port scans because they are usually the precursor to an actual attack. Port scans used to be highly visible, until more advanced port scanners became available, and port scans could then be done stealthily. Present IDSs are now able to detect stealthy port scans as well. One of the ways attackers can use to evade detection is to use decoy port scans. A decoy port scan is a port scan sent from a spoofed source. A large number of decoy scans are usually sent together with the actual port scan, so that it would be extremely difficult to distinguish the actual source of the scan from the spoofed sources.

FIG. 10 shows an example of a decoy port scan. The solid blank line represents the actual port scan, while the dashed lines represent decoy port scans. In this example, Node C2 is the target of the scan, and Node B4 is the actual source. Decoy port scans are spoofed from Nodes A1, B2, and C1. It should be noted that the scans do not actually come from these nodes. They are still sent by Node B4, but their source addresses have been forged. With a conventional IDS, Node C2 would be unable to distinguish which scans are actual, and which are decoys. A common mistake is for the administrator of Collective C to improperly assume that the decoy scans were actually sent from the decoy nodes. Further damage can be done if the administrator proceeds to ban those nodes from accessing Collective C.

The administrator is able to gather better results using the IDF. With IDF agents installed, Node C2 is able to query the supernode collectives to check if the scans actually originated from Nodes A1, B2, B4, and C1. The supernode collective's correlation mechanisms is able to distinguish that only Node B4 actually sent the scan, and there were none from Nodes A1, B2, and C1. Therefore, the IDF is able to provide a more accurate report on what actually happened to the administrator of Collective C.

Figure 11:
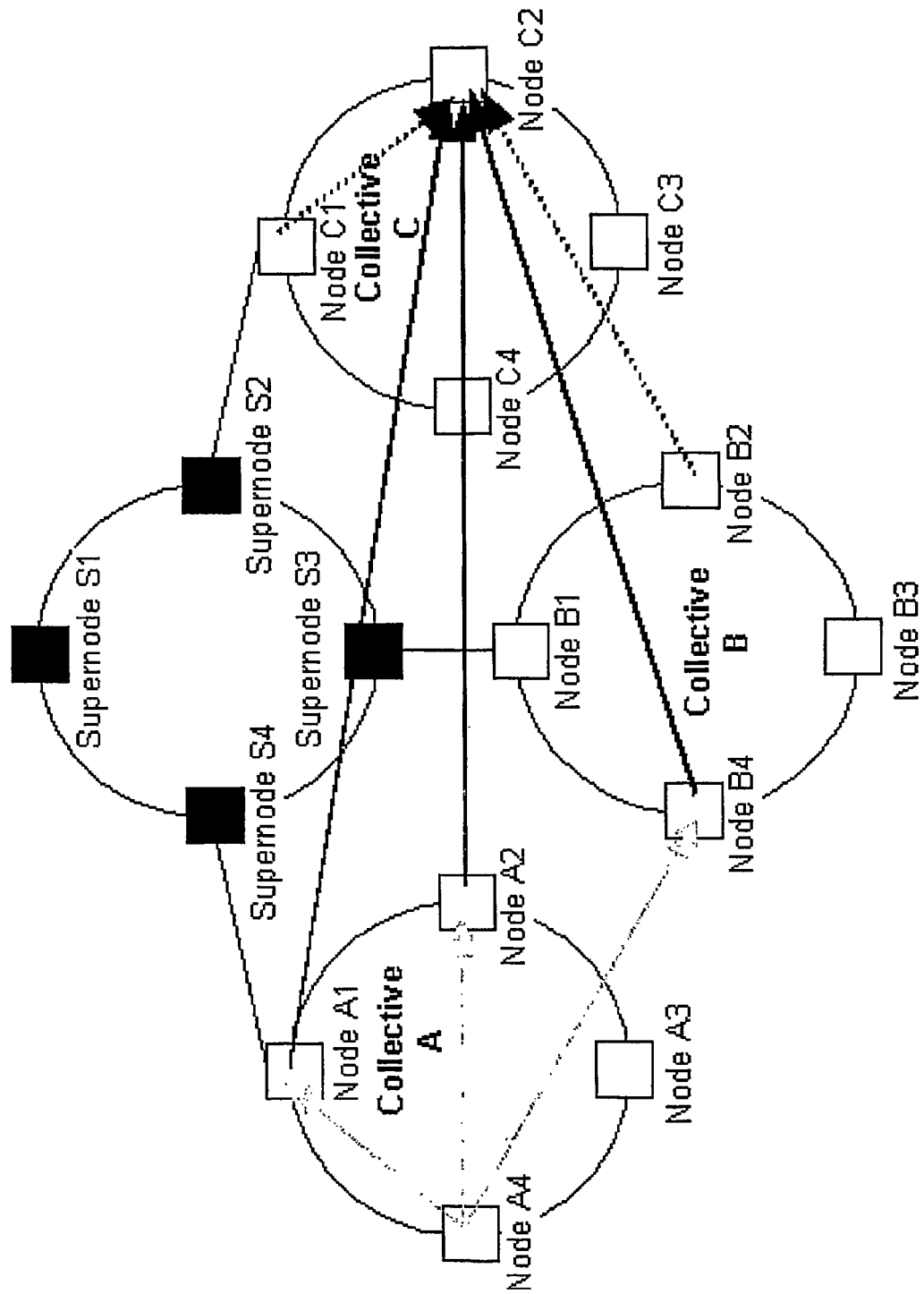
FIG. 11 is a block diagram illustrating how one embodiment of the present invention detects and responds to a distributed denial of service (DDoS) attack with random IP spoofing.

FIG. 11 is a block diagram, illustrating how the IDF detects and responds to a distributed denial of service (DDoS) attack with random IP spoofing. The solid black arrows represent the actual DDoS attacks, while the dashed arrows represent spoofed attacks. The gray arrows with double arrowheads represent control traffic from the DDoS handler to DDoS agents.

An attacker uses a denial of service (DoS) attack to disable or overwhelm a target, such that the target is rendered nearly or totally inoperable. This is normally accomplished by flooding the target with excessive network traffic such that it is unable to respond, or by exploiting software bugs in the target that would cause it to exhaust its resources. A distributed denial of service (DDoS) attack involves conducting DoS attacks against one or more targets from many sources in a coordinated manner. The aim of a DDoS attack is to maximize the damage to the target by introducing more sources of attack. This is usually done on targets with better capabilities like higher processing power or larger bandwidth, where a single or small number of individual DoS attacks would not suffice in bringing it down.

A DDoS attack is usually carried out by running a program consisting of two entities: the handler and the agent. The handler is a control program that is used to control many agents. The agents will then be used to conduct the actual DoS attacks, upon receiving the commands from the handler. DDoS tools also commonly spoof attacks from other machines, so that it would appear as if other machines are carrying out the attack as well.

FIG. 11 shows an example of a DDoS attack. In this example, Node A4 is the handler. DDoS agents are running on Nodes A1, A2, and B4. The gray lines with double arrowheads show the control traffic from the handler (Node A4) to the DDoS agents at Nodes A1, A2, and B4. The solid black arrows show the actual attack traffic from the DDoS agents at A1, A2, and B4. The dashed arrows show the spoofed attack traffic from Nodes B2 and C1. Although this Figure just shows attack traffic from three actual sources and two decoy sources, in reality a DDoS attack would normally involve a very large number of hosts.

It is usually extremely difficult to identify the actual source of a DDoS attack because of the widely distributed DDoS agents and spoofed traffic. Conventional IDSs in organizations that do not exchange information with other organizations would be unable to correlate the traffic among all the nodes and arrive at the overall picture.

If the IDF is deployed globally, administrators are able to gather more in-depth information about the overall picture behind the DDoS attack. For example, Node C2 will be able to query the supernode collective to identify which nodes are attacking it. The IDF may also respond by setting up preventative mechanisms to block the attacks (such as modifying the configuration of routers to temporarily block traffic from the attacking nodes). The IDF is able to correlate the control traffic from Node A4 to the DDoS agents, thereby identifying Node A4 as the source of the entire attack. These capabilities will make the IDF more effective at investigating DDoS attacks.

Figure 12:
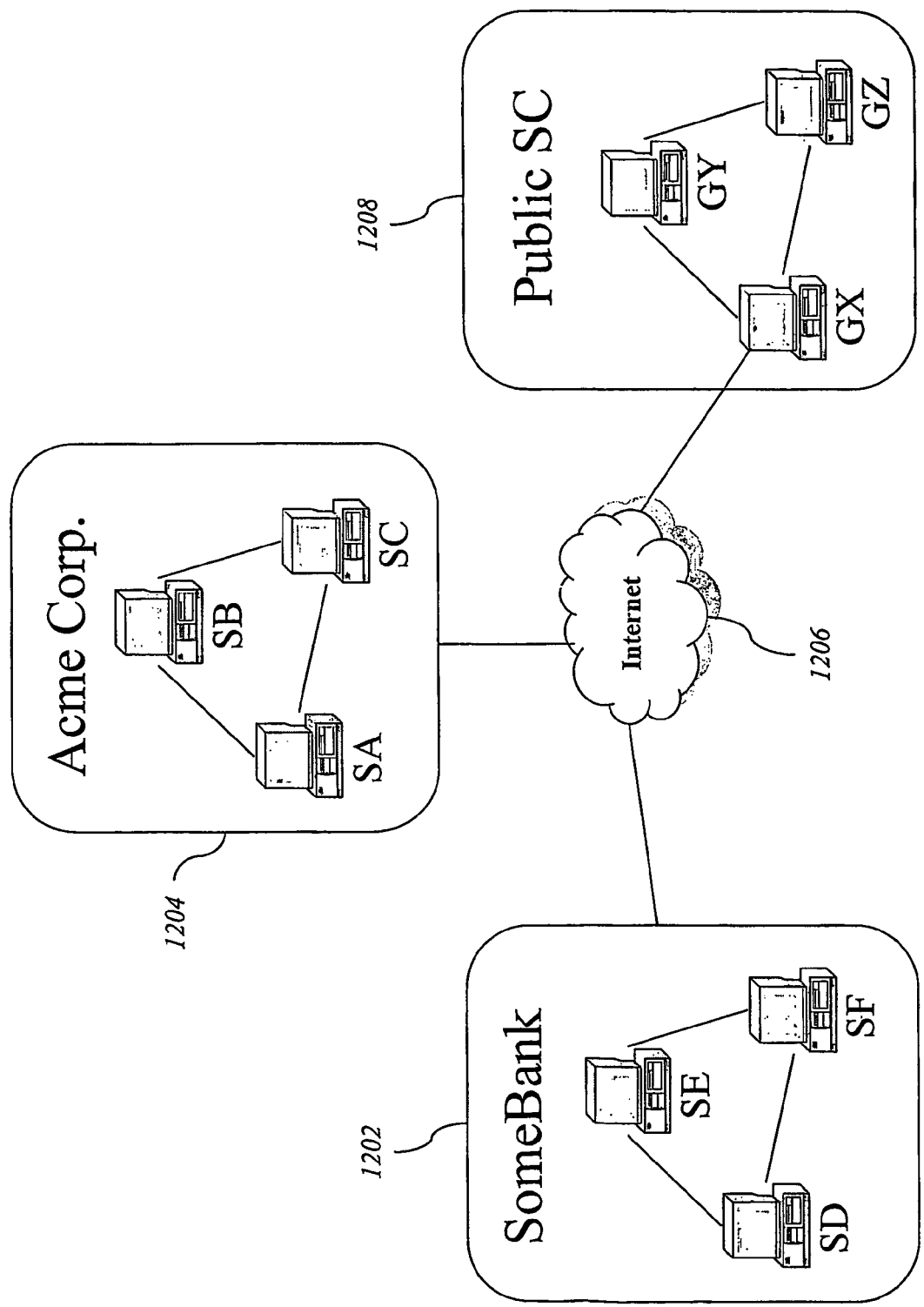
FIG. 12 is a block diagram illustrating one embodiment of the present invention spanning multiple organizations.

FIG. 12 is a block diagram illustrating multiple organizational IDF's linked by the Internet in one embodiment of the present invention. In the embodiment shown, Acme Corp. and SomeBank each have super collectives 1202 and 1204 in communication via the Internet 1206. They wish to share IDF resources. Acme and SomeBank may have different privacy policies with regards to information sharing via the IDF.

In the embodiment shown, a publicly known super-collective (Public SC) stores the locations of all super-collectives in the IDF. A computer within an organization queries the Public SC to link to the company it wants to link to. In another embodiment, the IDF's link by explicitly specifying the collectives to which they want to link.

In the embodiment shown, Acme first states its intent to register with SomeBank by contacting the Public SC. The Public SC forwards the request to SomeBank. SomeBank and Acme negotiate their privacy and information sharing policies. SomeBank acknowledges the request, and Acme and SomeBank are now linked.

In another embodiment, instead of utilizing a publicly known super-collective, Acme contacts SomeBank directly. Privacy policy negotiation takes place before the actual link happens. For example, the administrator at SomeBank may be given the option to manually verify Acme's request, since the request is no longer forwarded by a trusted authority (such as the Public SC in FIG. 12). Once verified, SomeBank sends the acknowledgment to Acme. This embodiment may be particularly advantageous for organizations with very conservative information sharing policies.

An embodiment may be implemented advantageously in a variety of environments. For example, in a large organization with a multitude of computing platforms and individual devices, it is extremely difficult to maintain a consistent level of security. In addition, large enterprises require extensive resources to maintain these platforms and devices and may have less time to devote to discovering, tracking, and thwarting attacks. In such an environment, the IDF can help secure enterprise systems by detecting stealthy attacks using correlation among the nodes and supernodes within the organization and thereby help to secure the hosts and networks of the enterprise.

Small to medium-sized businesses also benefit from implementation of an embodiment. Although small to medium-sized businesses face many of the same types of attacks as large enterprises, they often lack the requisite technical resources to ensure that their systems are properly secured and maintained. A system according to the present invention helps ease these businesses burden of keeping their systems properly secured. The advantages are evident; computer intrusions, whether caused by humans or viruses, can be especially damaging to the operations of a small to mid-sized business and the IDF helps to stop these intrusions.

An embodiment of the present invention may also be advantageously integrated into the products of software and hardware vendors. For example, software development companies may want to integrate IDF technology so that their software can contribute towards the overall security of their end users' systems. And computer manufacturers (e.g. Dell, HP, Gateway) may choose to include IDF technology as part of their offerings to the customer, allowing the computer manufacturer to advertise that their products contribute to the overall security of the client's organizations. Additionally, the software updates distribution engine may potentially save costs by reducing the number of technical support calls, as customers' software are less likely to have problems if they are patched in a timely manner.

An embodiment may also be advantageously implemented in an individual end user's computer(s). The vast majority of end users are simply not technically skilled enough or do not have sufficient time to keep their systems properly secured. An embodiment of the present invention can potentially automate the tedious tasks of maintaining security patches and software updates in the background without disrupting the end users' daily routines.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A node infrastructure implemented in a resident memory of at least one computing device on top of an existing computer network comprising:
   a) a plurality of nodes arranged in a collective configured in a ring topology wherein there are at least two independent collectives in a zone of the computer network, each node comprising a host and a security agent capable of being executed on the host configured to identify data about an attack on the node;
   b) a plurality of super nodes arranged in a first super collective having authority of the zone of the computer network and configured in a ring topology having the at least two independent collectives in the zone associated with the first super collective each super node comprising a host and software capable of analyzing data received from a node in an associated collective about an attack on the node and sharing the data with other super nodes in the super collective;

c) wherein each collective directly delivers data to an associated super node in the associated super collective; and d) wherein each node can only share data between nodes in its collective and its associated super node in the associated super collective.

2. The infrastructure according to claim 1 wherein the super nodes provide higher level services to the associated collectives in a hierarchical manner.

3. The infrastructure according to claim 1 wherein nodes within a collective can exchange data to minimize the loss of the data in the event of a host crash or a denial-of-service attack.

4. The infrastructure according to claim 1 wherein there are two node infrastructures each infrastructure having authority over a separate zone which are associated for the purpose of sharing data through a super node in each of their respective super collectives.

5. The infrastructure according to claim 1 wherein the super collective is able to identify an attack that occurs on nodes in different collectives.

6. The infrastructure according to claim 1 wherein the super collective is capable of detecting if data originated from a node in an associated collective.

7. The infrastructure according to claim 1 wherein a collective only has one associated super collective.

8. The infrastructure according to claim 1 wherein a super node shares data with a collective other than the collective where data was initially received from.

9. The infrastructure according to claim 1 wherein a node in a collective can share data with more than one super node in an associated super collective.

10. The infrastructure according to claim 1 wherein in the event one or more nodes in a collective become inactive or unavailable due to maintenance, hardware failure/software failure, or denial-of-service attack the remaining active nodes in a collective can reconstruct the ring topology of the collective to continue sharing data.

11. The infrastructure according to claim 1 wherein in the event one or more super nodes become inactive or unavailable due to maintenance, hardware failure/software failure, or denial-of-service attack the remaining active super nodes in the super collective can reconstruct the ring topology of the super collective to continue sharing data.

* * * * *